United States Patent
Lee et al.

(10) Patent No.: US 11,122,589 B2
(45) Date of Patent: Sep. 14, 2021

(54) METHOD AND DEVICE FOR ALLOCATING PTRS TO RESOURCE BLOCK IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Kijun Kim, Seoul (KR); Kyuseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 16/613,726

(22) PCT Filed: May 10, 2018

(86) PCT No.: PCT/KR2018/005356
§ 371 (c)(1),
(2) Date: Nov. 14, 2019

(87) PCT Pub. No.: WO2018/212505
PCT Pub. Date: Nov. 22, 2018

(65) Prior Publication Data
US 2020/0077419 A1 Mar. 5, 2020

Related U.S. Application Data

(60) Provisional application No. 62/505,976, filed on May 14, 2017, provisional application No. 62/520,666, (Continued)

(51) Int. Cl.
*H04W 4/00* (2018.01)
*H04W 72/12* (2009.01)
*H04L 5/00* (2006.01)

(52) U.S. Cl.
CPC ....... *H04W 72/1231* (2013.01); *H04L 5/0048* (2013.01)

(58) Field of Classification Search
CPC .................. H04W 72/1231; H04L 5/0048
(Continued)

(56) References Cited

U.S. PATENT DOCUMENTS

2018/0205528 A1* 7/2018 Bai .................. H04L 5/0058
2020/0021470 A1* 1/2020 Sun .................. H04L 27/261

FOREIGN PATENT DOCUMENTS

KR 1020140065392 5/2014
KR 1020150090586 8/2015

OTHER PUBLICATIONS

CMCC ("Phase Noise Reference Signal Design for High Frequency Systems", Reno, USA Nov. 14-18, 2016, R1-1612186) (Year: 2016).*
(Continued)

Primary Examiner — Maharishi V Khirodhar
(74) Attorney, Agent, or Firm — Lee, Hong, Degerman, Kang & Waimey

(57) ABSTRACT

According to an embodiment of the present specification, a method for transmitting, by a base station, a signal for eliminating phase noise by a terminal in an mmWave communication system may be provided. A method for transmitting a signal for eliminating phase noise may comprise the steps of: generating a PTRS; allocating the PTRS to one or more resource blocks included in a scheduled bandwidth; and transmitting the allocated PTRS, wherein an interval between the one or more resource blocks, to which the PTRs are allocated, is determined on the basis of the scheduled bandwidth.

16 Claims, 23 Drawing Sheets

Related U.S. Application Data filed on Jun. 16, 2017, provisional application No. 62/523,808, filed on Jun. 23, 2017, provisional application No. 62/548,348, filed on Aug. 21, 2017, provisional application No. 62/548,921, filed on Aug. 22, 2017, provisional application No. 62/549,904, filed on Aug. 24, 2017.

(58) Field of Classification Search
USPC .......................................................... 370/329
See application file for complete search history.

(56) References Cited

OTHER PUBLICATIONS

Nokia, Alcatel-Lucent Shanghai Bell ("On the PTRS design for NR", R1-1701105, Jan. 16-20, 2017), (Year: 2017).*

Ericsson, "On PTRS design", R1-1703220, Athens, Greece, Feb. 13-17, 2017 (Year: 2017).*

Ericsson "On DL PTRS Design", R1-1705906, Apr. 3-7, 2017 (Year: 2017).*

Intel Corporation, R1-1704736, Spokane, USA, Apr. 3-7, 2017, "On RS for Phase Tracking" (Year: 2017).*

PCT International Application No. PCT/KR2018/005356, Written Opinion of the International Searching Authority dated Sep. 10, 2018, 22 pages.

LG Electronics, "On UL PT-RS design", 3GPP TSG RAN WG1 Meeting #89, R1-1707617, May 2017, 8 pages.

LG Electronics, "On DL PT-RS design", 3GPP TSG RAN WG1 Meeting #89, R1-1707616, May 2017, 6 pages.

Huawei, et al., "Furhter details for PT-RS design", 3GPP TSG RAN WG1 Meeting #88b, R1-1704240, Apr. 2017, 5 pages.

European Patent Office Application Serial No. 18802327.9, Search Report dated Feb. 9, 2021, 18 pages.

CMCC, "Phase Noise Reference Signal Design for High Frequency Systems," 3GPP TSG RAN WG1 Meeting #87, R1-1612186, Nov. 2016, 11 pages.

LG Electronics, "Discussion on Common Phase Error Compensation for Above 6GHz," 3GPP TSG RAN WG1 Meeting #86bis, R1-1609261, Oct. 2016, 11 pages.

Nokia et al., "On the PTRS design for NR," 3GPP TSG RAN WG1 NR Ad-Hoc Meeting, R1-1701105, Jan. 2017, 16 pages.

Ericsson, "On PTRS deesign," 3GPP TSG-RAN WG1 #88, R1-1703220, Feb. 2017, 4 pages.

* cited by examiner

FIG. 4
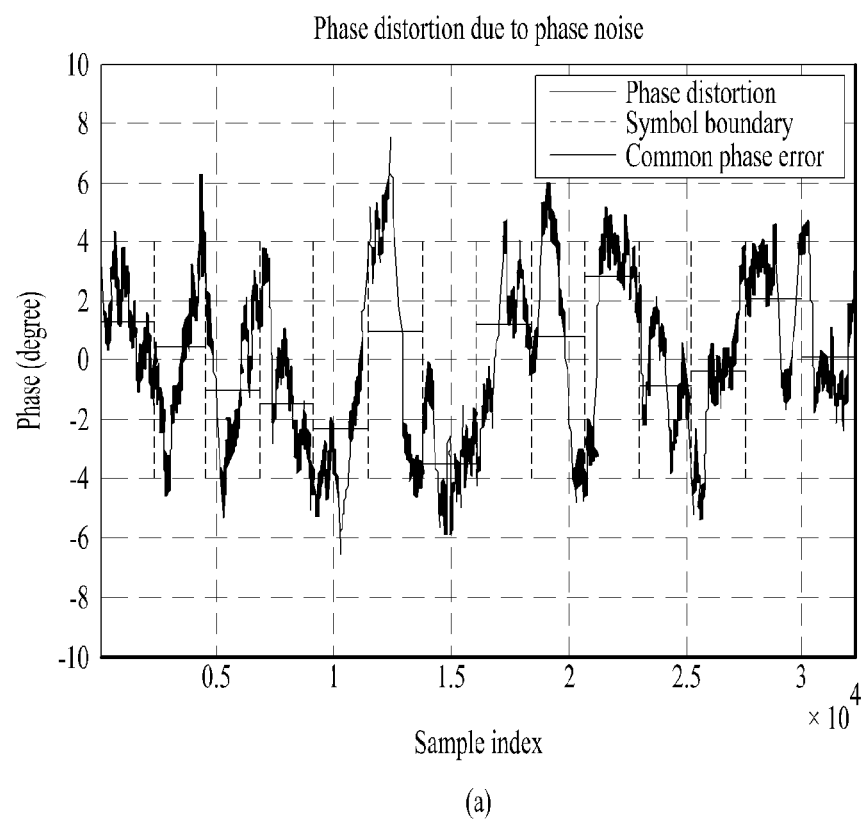
(a)
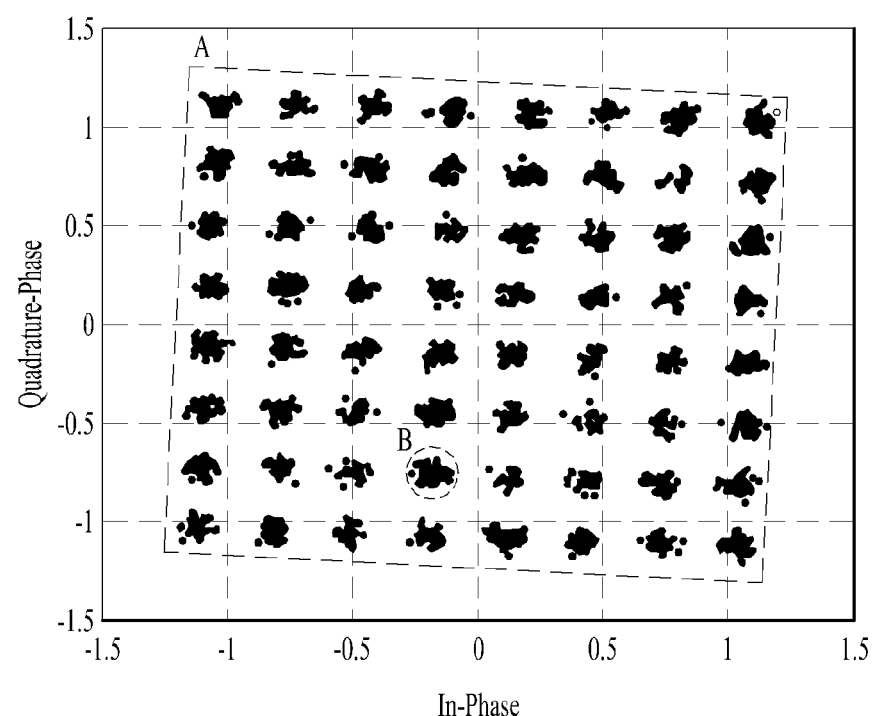
(b)

FIG. 5
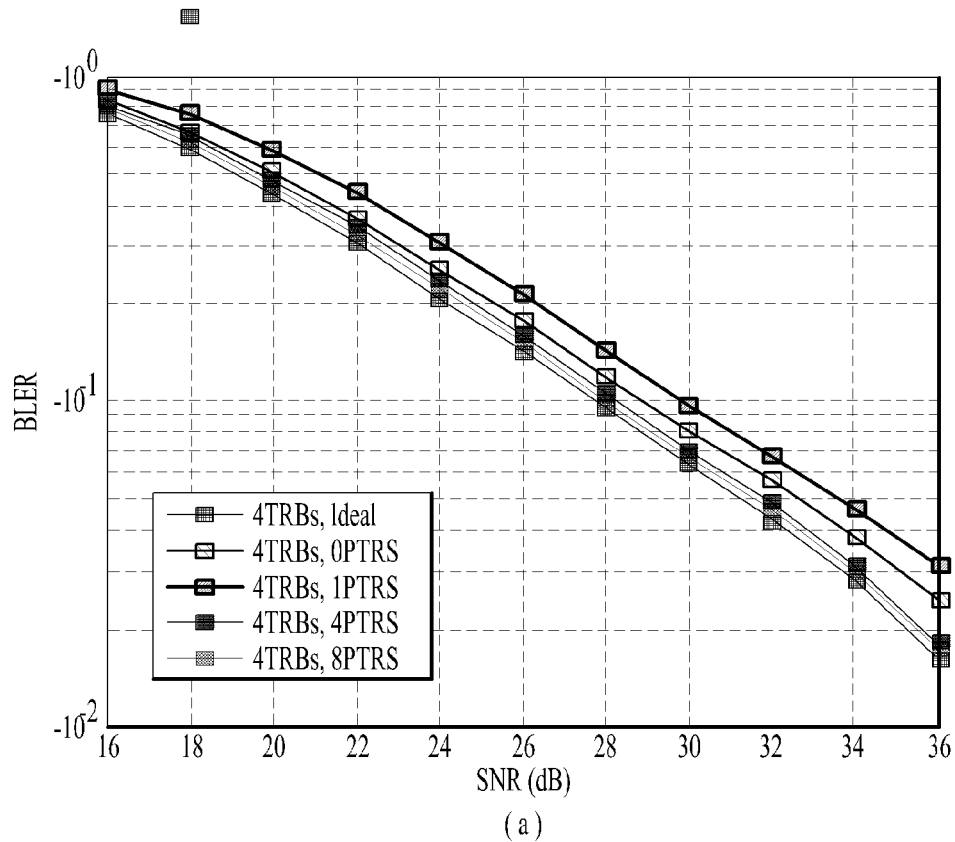
(a)
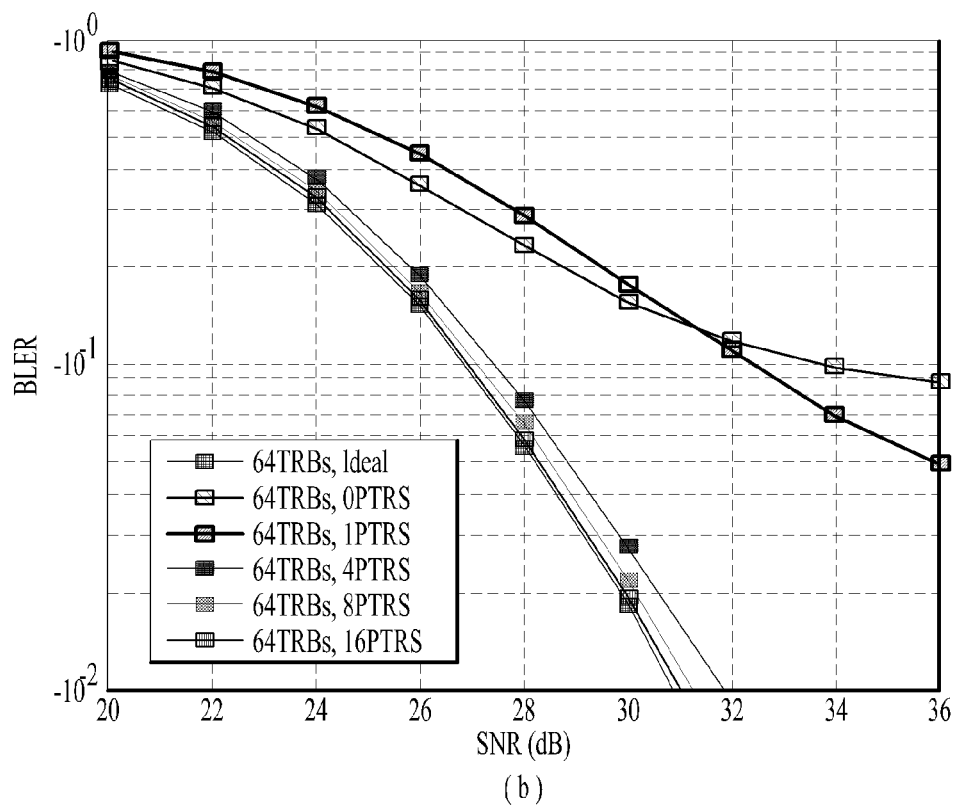
(b)

FIG. 10
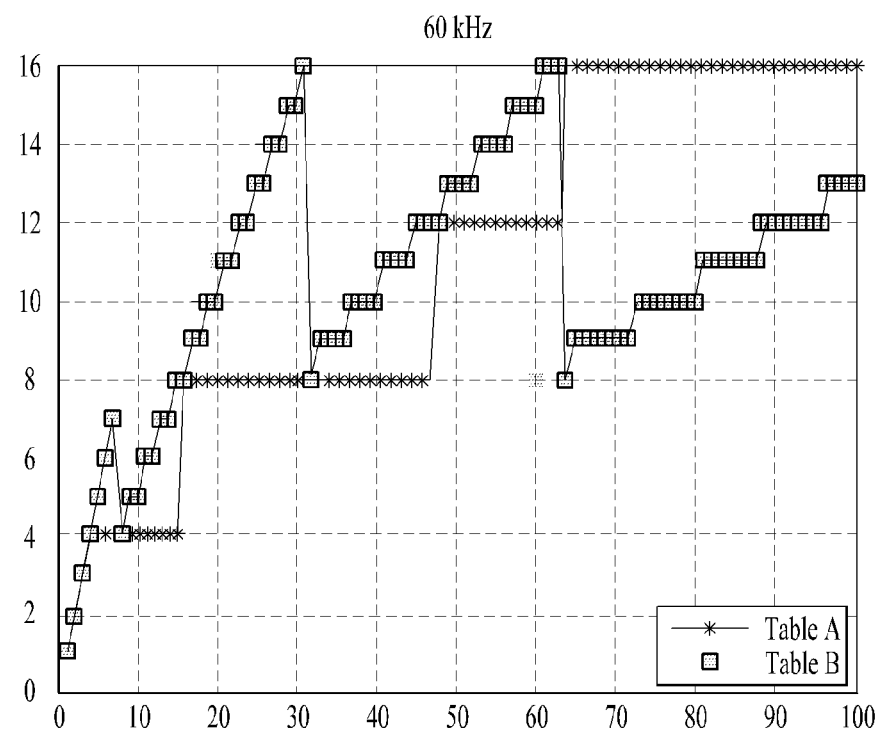
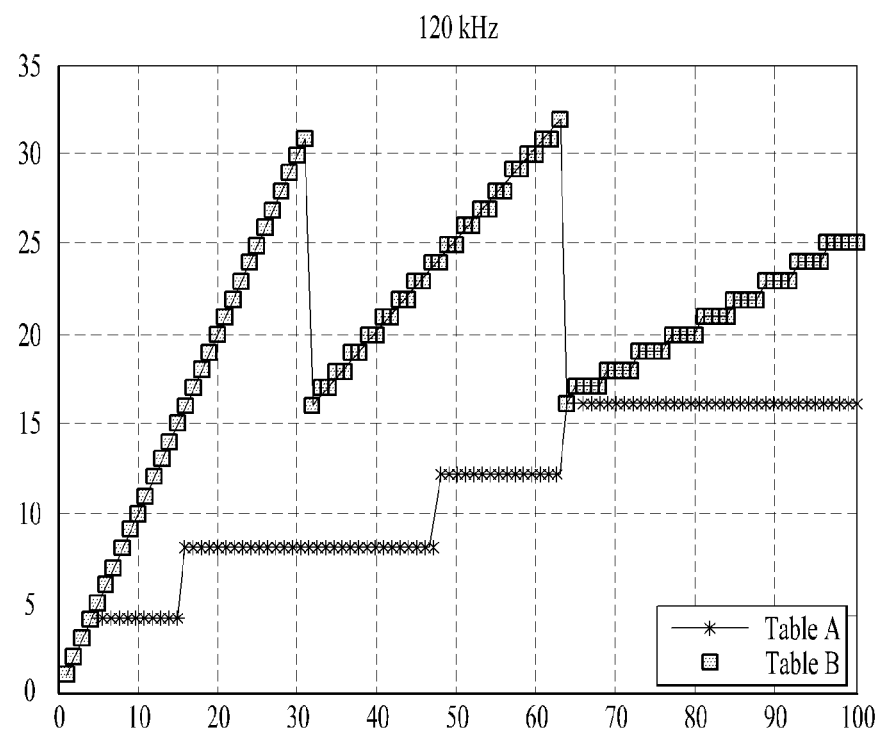

FIG. 11
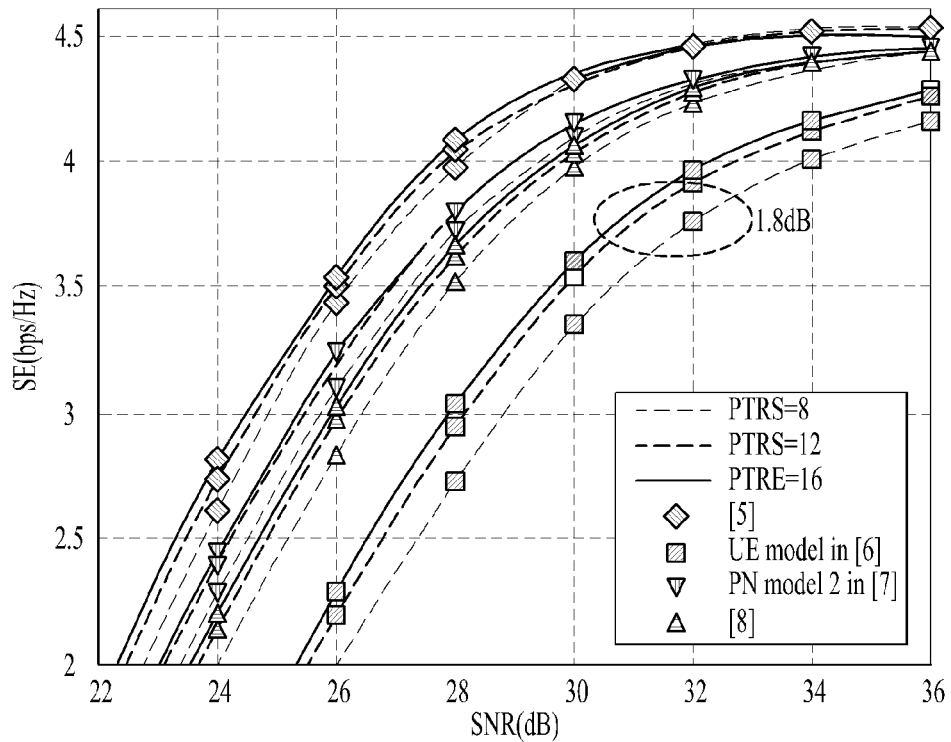
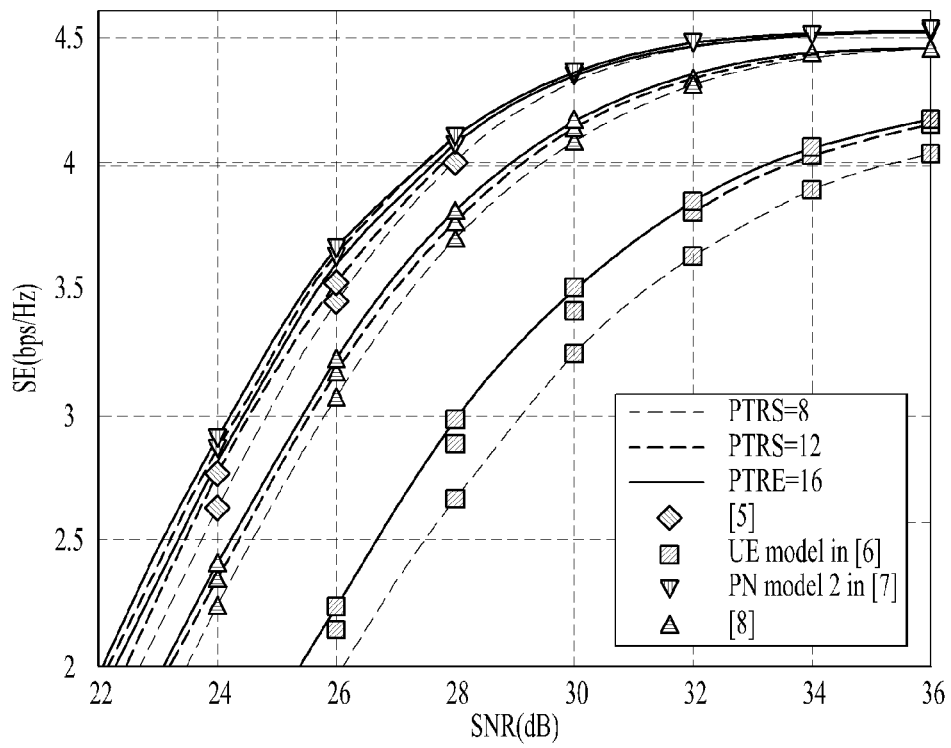

FIG. 17
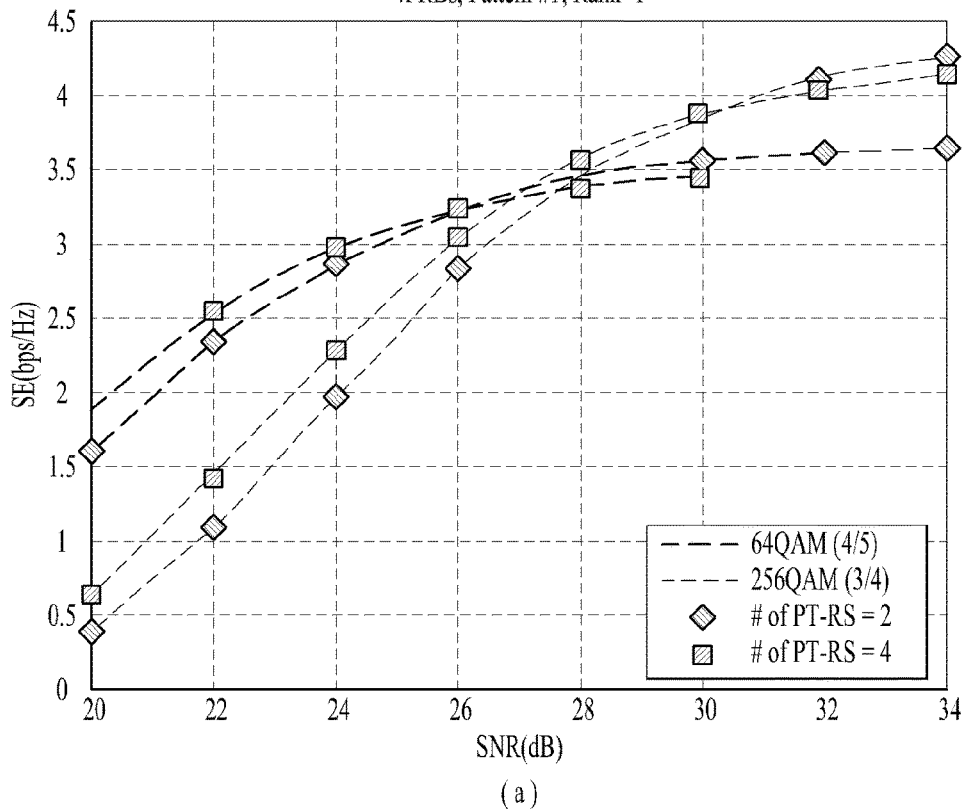
(a)
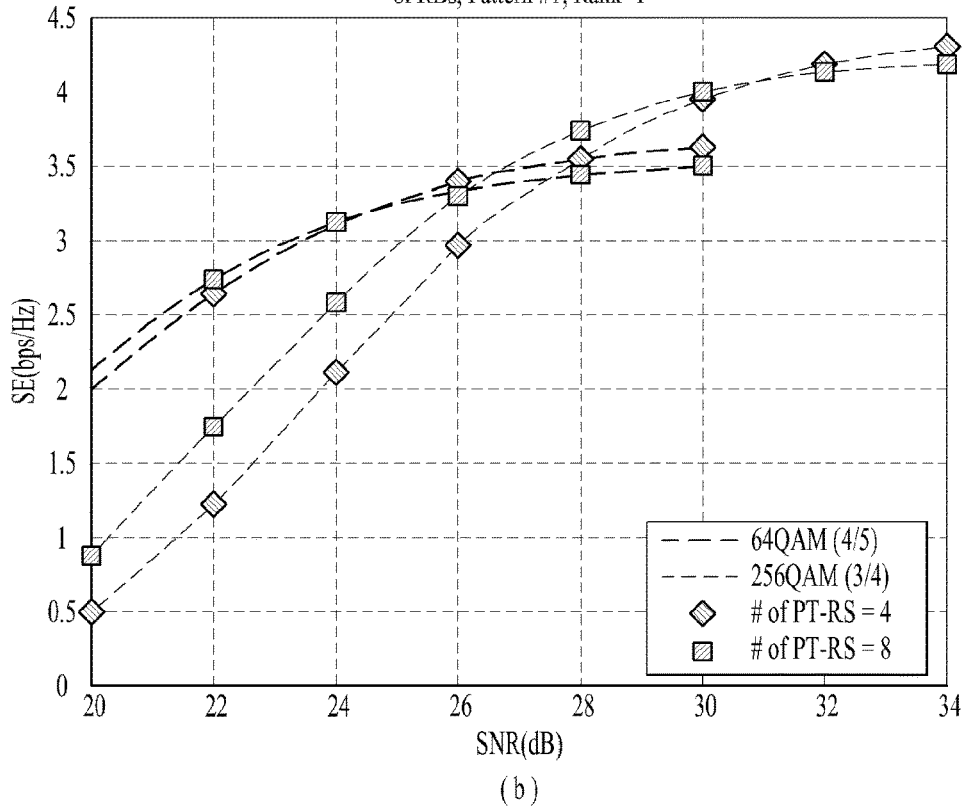
(b)

FIG. 18
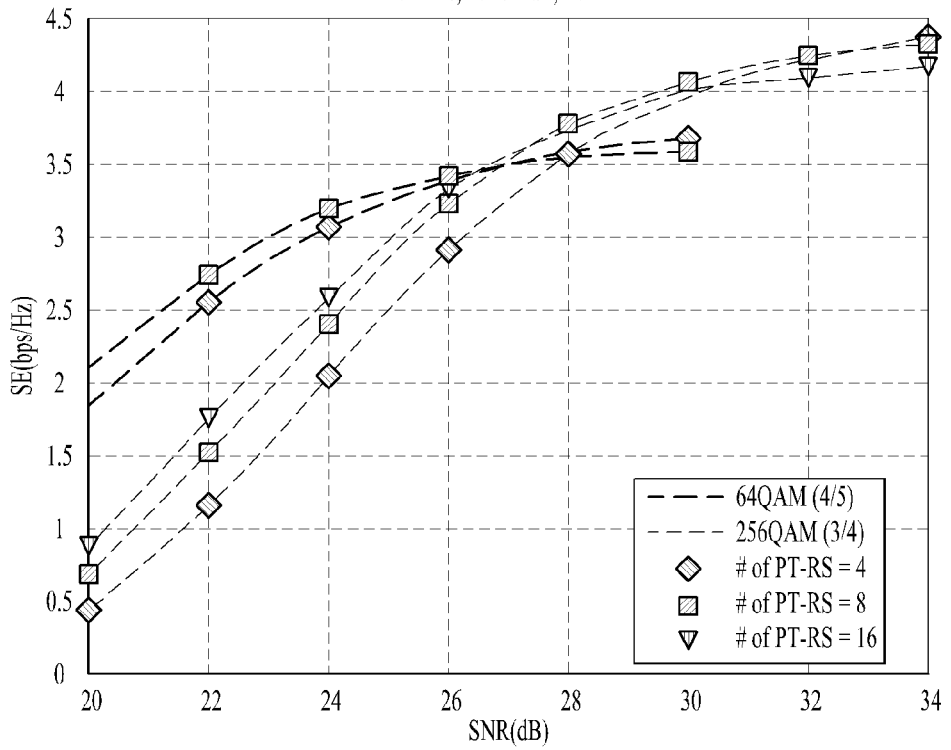
(a)
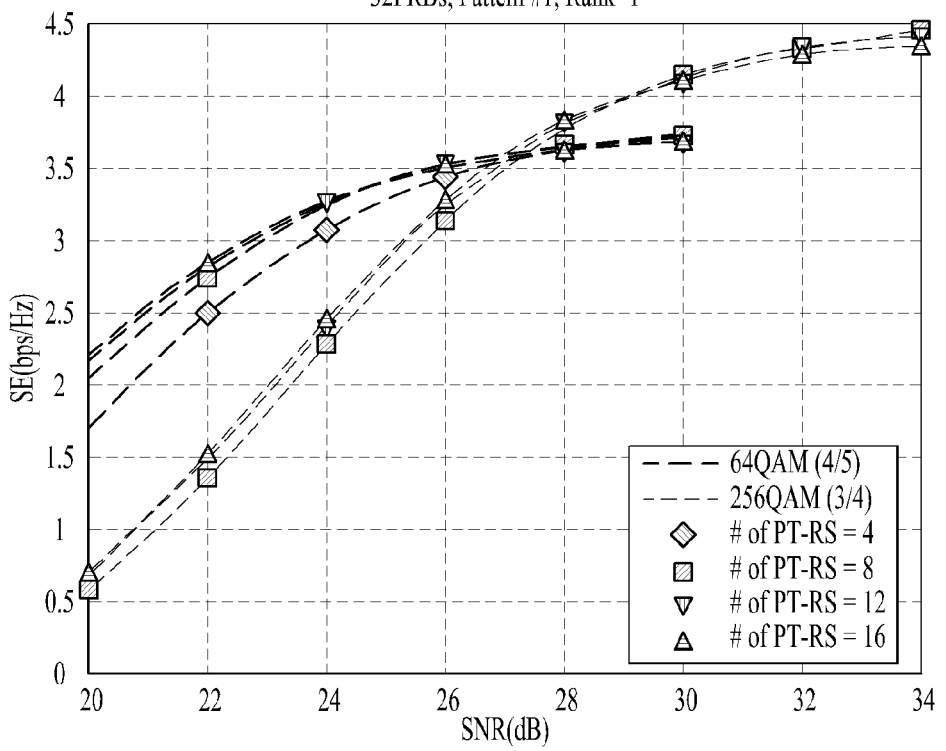
(b)

FIG. 19
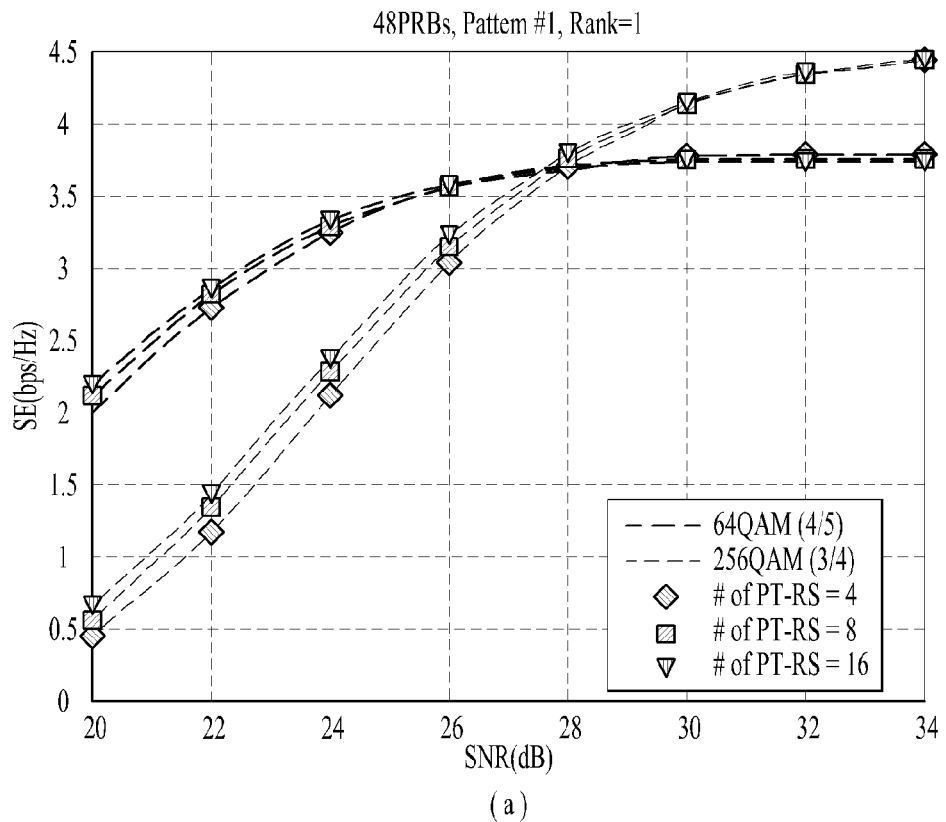
(a)
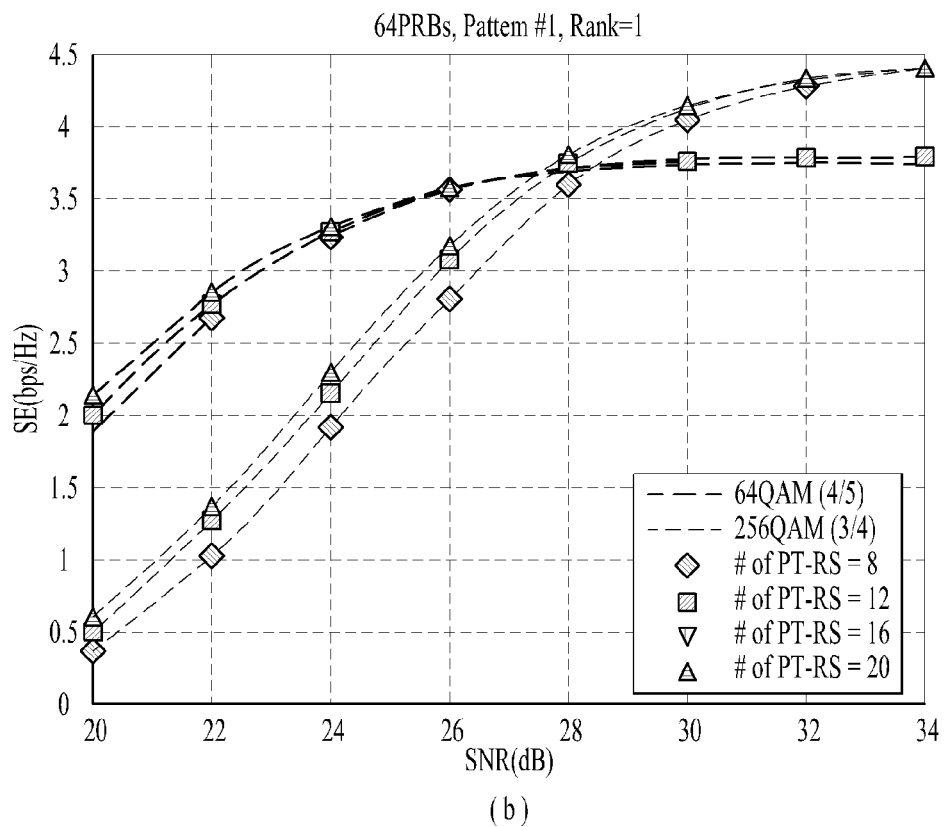
(b)

FIG. 20
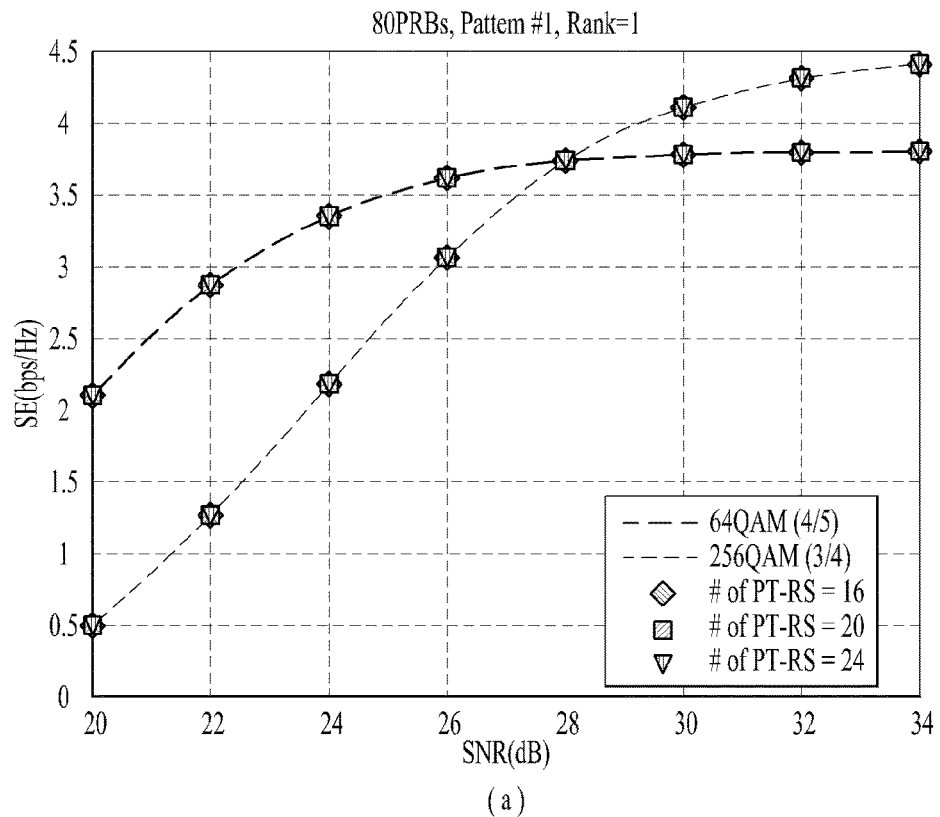
(a)
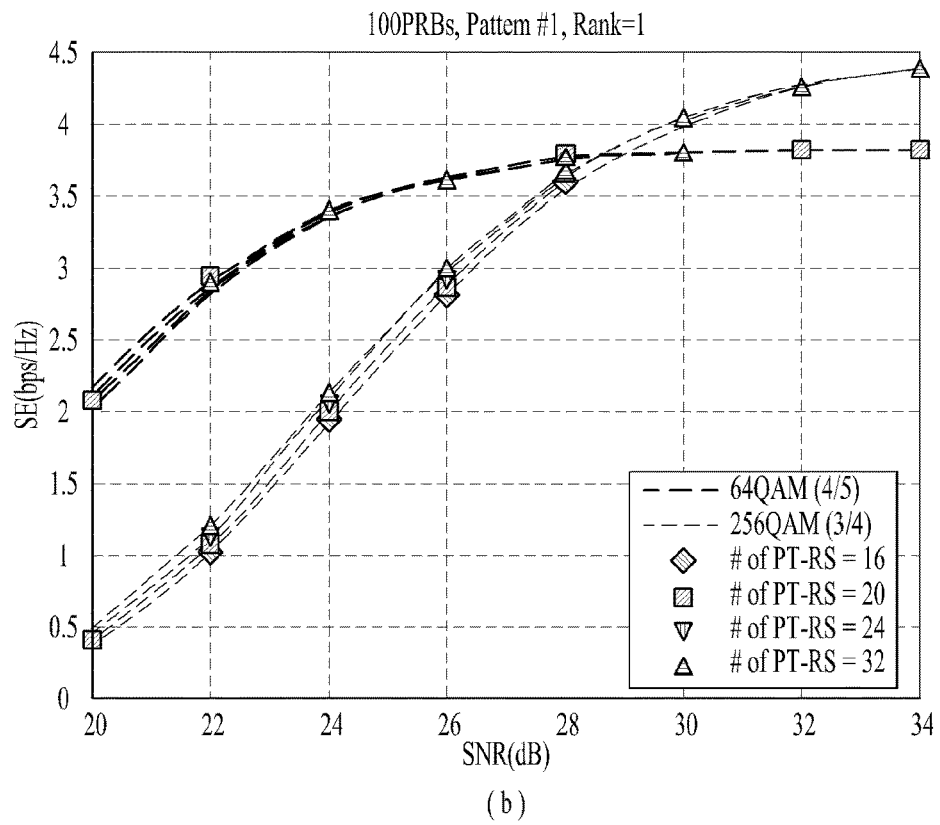
(b)

METHOD AND DEVICE FOR ALLOCATING PTRS TO RESOURCE BLOCK IN WIRELESS COMMUNICATION SYSTEM

CROSS-REFERENCE TO RELATED APPLICATIONS

This application is the National Stage filing under 35 U.S.C. 371 of International Application No. PCT/KR2018/005356, filed on May 10, 2018, which claims the benefit of U.S. Provisional Application No. 62/505,976, filed on May 14, 2017, 62/520,666, filed on Jun. 16, 2017, 62/523,808, filed on Jun. 23, 2017, 62/548,348, filed on Aug. 21, 2017, 62/548,921, filed on Aug. 22, 2017, and 62/549,904, filed on Aug. 24, 2017, the contents of which are all hereby incorporated by reference herein in their entireties.

TECHNICAL FIELD

The present disclosure relates to a wireless communication system, and more particularly, to a method of allocating a phase tracking reference signal (PTRS) for phase noise cancellation to a resource block in a system and device therefor.

BACKGROUND ART

An ultrahigh frequency wireless communication system based on mmWave is configured to operate at a center frequency of several GHz to several tens of GHz. Due to the characteristic of the center frequency, a pathloss may considerably occurs in a radio shadow area. Since it is necessary to stably transmit a synchronization signal to all terminals belonging to the coverage of a base station, it is necessary to design and transmit a synchronization signal in consideration of a potential deep-null phenomenon capable of being occurred due to the characteristic of the ultrahigh frequency band in the mmWave communication system.

DISCLOSURE

Technical Problem

The present disclosure is contrived to solve the aforementioned problems. Accordingly, an object of the present disclosure is to provide a method of allocating a PTRS to a resource block.

Another object of the present disclosure is to achieve accurate decoding of a received signal by improving a phase noise cancellation procedure performed by a terminal in a wireless communication system.

A further another object of the present disclosure is to provide a method of determining the frequency density of PTRSs allocated to resource blocks.

Still another object of the present disclosure is to improve receiving-side operation by providing information on signal transmission for phase noise cancellation.

Still a further object of the present disclosure is to provide a method of transmitting a signal for phase noise cancellation by considering compensation for phase noise and reference signal overhead.

Technical Solution

In an aspect of the present disclosure, provided is a method of transmitting, by a base station, a signal for enabling a user equipment (UE) to eliminate phase noise in a millimeter wave (mmWave) communication system. The method may include generating a phase tracking reference signal (PTRS), allocating the PTRS to one or more resource blocks included in a scheduled bandwidth, and transmitting the allocated PTRS. In this case, the interval between the one or more resource blocks to which the PTRS is allocated may be determined based on the scheduled bandwidth.

In another aspect of the present disclosure, provided is a base station for transmitting a signal for enabling a UE to eliminate phase noise in a mmWave communication system. The base station may include a receiver configured to receive a signal from an external device, a transmitter configured to transmit a signal to an external device, and a processor configured to control the receiver and the transmitter. In this case, the processor may be configured to generate a PTRS, allocate the PTRS to one or more resource blocks included in a scheduled bandwidth, and control the transmitter to transmit the allocated PTRS. The interval between the one or more resource blocks to which the PTRS is allocated may be determined based on the scheduled bandwidth.

According to an embodiment of the present disclosure, when the scheduled bandwidth is less than a first threshold, the interval between the one or more resource blocks to which the PTRS is allocated may be 1, that is, one PTRS may be allocated for each resource block. When the scheduled bandwidth is more than or equal to the first threshold and less than a second threshold, the interval between the one or more resource blocks to which the PTRS is allocated may be 2, that is, one PTRS may be allocated for every two resource blocks. When the scheduled bandwidth is more than the second threshold, the interval between the one or more resource blocks to which the PTRS is allocated may be 4, that is, one PTRS may be allocated for every four resource blocks.

According to an embodiment of the present disclosure, the maximum number of PTRS subcarriers to which the PTRS is allocated may be determined based on the scheduled bandwidth.

According to an embodiment of the present disclosure, when the PTRS is allocated based on the interval between the one or more resource blocks to which the PTRS is allocated, if the number of one or more resource blocks to which the PTRS is allocated is more than the maximum number of PTRS subcarriers, the PTRS may not be allocated to remaining resource blocks included in the scheduled bandwidth.

According to an embodiment of the present disclosure, the PTRS may be allocated starting from a resource block with a low resource block index based on the interval between the one or more resource blocks to which the PTRS is allocated.

According to an embodiment of the present disclosure, the indices of the resource blocks to which the PTRS is allocated may be shifted based on at least one of the identification (ID) of the UE or the maximum number of shiftable resource blocks.

According to an embodiment of the present disclosure, the maximum number of shiftable resource blocks may correspond to the interval between the one or more resource blocks to which the PTRS is allocated.

According to an embodiment of the present disclosure, the number of PTRS subcarriers to which PTRS is allocated may be determined based on the scheduled bandwidth.

According to an embodiment of the present disclosure, the resource block indices of the one or more resource blocks to which the PTRS is allocated may be determined according to the following equation:

$$i = \left\lfloor l\frac{P}{L} \right\rfloor + k, l = 0, 1, \ldots, L-1,$$

where i denotes the indices of the resource blocks to which the PTRS is allocated, P denotes the scheduled bandwidth, L denotes the number of one or more PTRS subcarriers to which the PTRS is allocated, and k denotes an offset value.

Advantageous Effects

According to the present disclosure, it is possible to accurately decode a received signal by improving a phase noise cancellation procedure performed by a terminal in a wireless communication system.

According to the present disclosure, a method of improving signal transmission efficiency for phase noise cancellation can be provided.

According to the present disclosure, a method of determining the frequency density of PTRSs allocated to resource blocks can be provided.

According to the present disclosure, receiving-side operation can be improved by providing information on signal transmission for phase noise cancellation.

According to the present disclosure, a method of transmitting a signal for phase noise cancellation by considering compensation for phase noise and reference signal overhead can be provided.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

FIG. 4 is a diagram illustrating phase distortion due to phase noise.

FIG. 5 is a diagram illustrating block error rate (BLER) performance depending on PTRS density in a frequency domain.

FIG. 10 is a diagram illustrating a PTRS allocation method.

FIG. 11 is a diagram illustrating performance depending on the number of PTRS carriers.

FIG. 17 is a diagram illustrating performance depending on the number of PTRSs.

FIG. 18 is a diagram illustrating performance depending on the number of PTRSs.

FIG. 19 is a diagram illustrating performance depending on the number of PTRSs.

FIG. 20 is a diagram illustrating performance depending on the number of PTRSs.

BEST MODE

Figure 1:
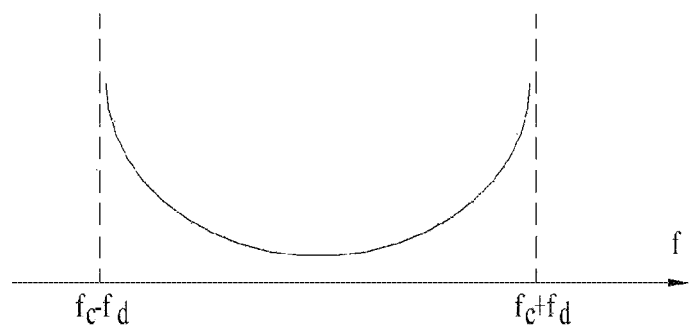
FIG. 1 is a diagram illustrating a Doppler spectrum.

Although the terms used in the present disclosure are selected from generally known and used terms, terms used herein may be varied depending on operator's intention or customs in the art, appearance of new technology, or the like. In addition, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meanings of each term lying within.

The following embodiments are proposed by combining constituent components and characteristics of the present disclosure according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present disclosure. The order of operations to be disclosed in the embodiments of the present disclosure may be changed. Some components or characteristics of any embodiment may also be included in other embodiments, or may be replaced with those of the other embodiments as necessary.

In describing the present disclosure, if it is determined that the detailed description of a related known function or construction renders the scope of the present disclosure unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present disclosure (particularly, the context of the following claims) clearly indicates otherwise.

In this document, the embodiments of the present disclosure have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro cell base station supporting the macro cell" and/or a "small cell base station supporting the small cell".

The embodiments of the present disclosure may be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present disclosure clear, may be supported by the above documents.

In addition, all the terms disclosed in the present document may be described by the above standard documents. In particular, the embodiments of the present disclosure may be supported by at least one of P802.16-2004, P802.16e-2005, P802.16.1, P802.16p or P802.16.1b documents, which are the standard documents of the IEEE 802.16 system.

Hereinafter, the preferred embodiments of the present disclosure will be described with reference to the accompanying drawings. It is to be understood that the detailed description which will be disclosed along with the accompanying drawings is intended to describe the exemplary embodiments of the present disclosure, and is not intended to describe a unique embodiment which the present disclosure may be carried out.

It should be noted that specific terms disclosed in the present disclosure are proposed for convenience of description and better understanding of the present disclosure, and the use of these specific terms may be changed to another format within the technical scope or spirit of the present disclosure.

1. Communication System Using Ultrahigh Frequency Band

In an LTE (Long Term Evolution)/LTE-A (LTE Advanced) system, an error value of oscillators between a UE and a base station (BS) (or an eNB) is defined by requirements as follows.

UE Side Frequency Error (in TS 36.101)

The UE modulated carrier frequency shall be accurate to within ±0.1 PPM observed over a period of one time slot (0.5 ms) compared to the carrier frequency received from the E-UTRA Node B eNB Side Frequency Error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency. Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=(v/\lambda)\cos\theta$. At this time, v is a moving speed of the UE, and λ means a wavelength of a center frequency of a radio wave which is transmitted. θ means an angle between the radio wave and a moving direction of the UE. Hereinafter, description will be given on the assumption that θ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $F_c$ and a maximum Doppler spread value is $F_d$.

Figure 2:
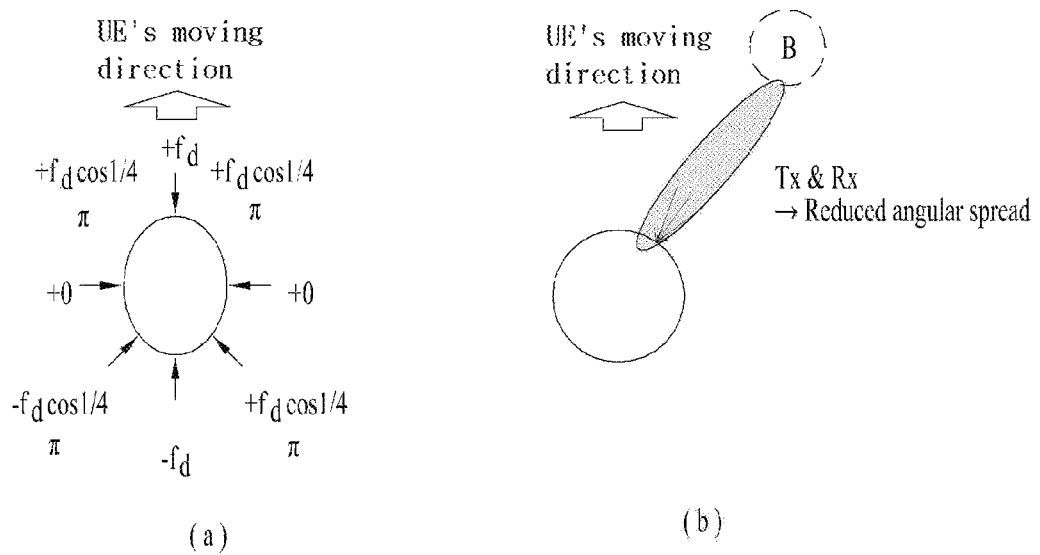
FIG. 2 is a diagram illustrating narrow beamforming related to the present disclosure.
Figure 3:
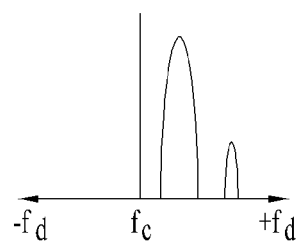
FIG. 3 is a diagram illustrating a Doppler spectrum when narrow beamforming is performed.

FIG. 2 is a diagram illustrating narrow beamforming related to the present disclosure, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

2. Phase Noise Analysis and Phase Tracking Reference Signal (PTRS) Design

FIG. 4 is a diagram illustrating phase distortion due to phase noise. The phase noise may be defined as the fluctuation in the phase of a signal that occurs during a short time. In this case, since the phase noise could randomly change the phase of the received signal in the time domain, it may interrupt the reception of the signal. For example, referring to FIG. 4(a), the phase noise may randomly occur. However, the phase noise may show certain correlation between adjacent time samples, which results in common phase error (CPE) and inter-carrier interference (ICI) in the frequency domain.

FIG. 4(b) shows the effect of CPE and ICI on received constellation points. It may be seen from FIG. 4(b) that in square 'A', all constellation points are rotated in three degrees, which results from the CPE. In addition, in circle 'B', constellation points are randomly placed, which results from the ICI. Accordingly, the CPE needs to be compensated for based on the phase noise, and a phase tracking reference signal (PTRS) may be used for CPE estimation. Table 1 below shows simulation conditions related to the phase noise.

TABLE 3

| PN Model | PN model 2 in [2] | CFO | 0 kHz |
|---|---|---|---|
| Carrier Frequency | 30 GHz | # of Traffic RBs | 4/64 |
| Subcarrier Spacing | 60 kHz | # of System RBs | 100 |
| Channel | TDL-B (30 ns, 0 km/h) | Modulation | 64QAM |
| Channel Estimation | Ideal | Code Rate | 5/6 |
| CPE Estimation | Real | | |

Referring to Table 3, it may be seen how the PTRS affects the CPE estimation when the number of traffic RBs is changed. FIG. 5 is a diagram illustrating block error rate (BLER) performance depending on PTRS density in the frequency domain. Specifically, FIGS. 5(a) and (b) show the results of measuring the BLER performance when the PTRS density is changed to 0, 1, 4, 8, and 16 in the frequency domain of an OFDM symbol. In this case, "PTRS=0" indicates no CPE compensation, and "Ideal" indicates the state in which CPE compensation is performed. More specifically, FIG. 5(a) shows the results of measuring the BLER performance by changing the PTRS density in the frequency domain when there are four TRBs, and FIG. 5(b) shows the results of measuring the BLER performance by changing the PTRS density in the frequency domain when there are 64 TRBs.

Comparing FIGS. 5(a) and 5(b), it may be seen that the BLER performance difference depending on the PTRS density increases as the TRB size increases. Specifically, it may be seen from FIG. 5(a) where the TRB size is small that the BLER performance difference between no CPE compensation and the CPE compensation with PTRS=8 is only about 1 dB. However, it may be seen that from FIG. 5(b) where the TRB size is large that the BLER performance difference between no CPE compensation and the CPE compensation with PTRS=8 is about 5.8 dB.

In addition, referring to FIG. 5(b), it may be observed that as the PTRS density increases, the BLER performance coverages to an ideal level based on the CPE compensation. Specifically, in FIG. 5(b), when the PTRS density is more than or equal to 4, the BLER performance coverages to the ideal level. Thus, when the PTRS density is 4 or 8, the CPE may be sufficiently compensated for. In both FIGS. 5(a) and 5(b), when the PTRS density is 4 or 8, the CPE may be sufficiently compensated for regardless of the TRB size.

Figure 6:
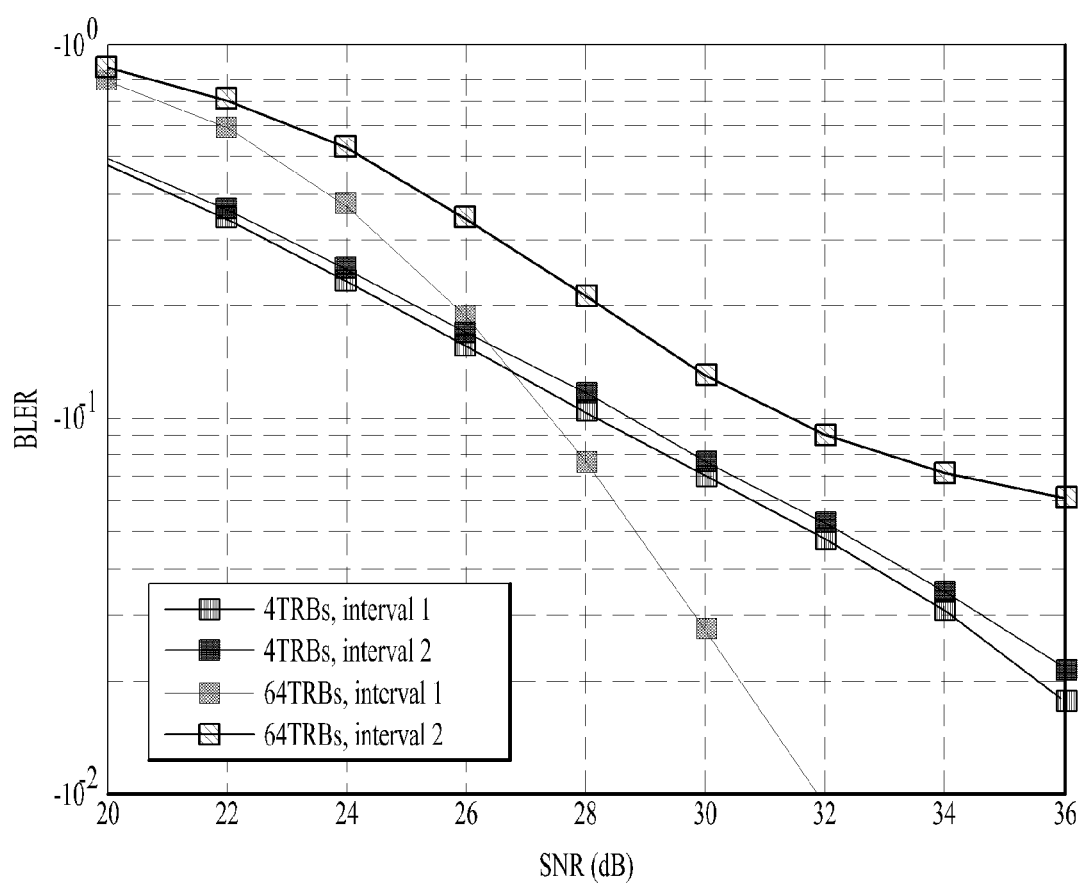
FIG. 6 is a diagram illustrating BLER performance depending on PTRS density in a time domain.

FIG. 6 is a diagram illustrating BLER performance depending on PTRS density in the time domain.

FIG. 6 shows the results of measuring the BLER performance by changing a PTRS interval in the time domain. In FIG. 6, the number of PTRSs in one 01-DM symbol is 4. Referring to FIG. 6, it may be seen that the results are similar to those of FIG. 5. Specifically, it may be observed that as the TRB size increases, the BLER performance difference depending on the PTRS density in the time domain increases. That is, when the TRB size is small (4 TRBs in FIG. 6), similar BLER performance may be obtained regardless of the PTRS density in the time domain. However, it may be seen that when the TRB size is large (64 TRBs in FIG. 6), the BLER performance is significantly changed depending on the PTRS density in the time domain. In other words, as the TRB size increases, the BLER performance difference may be significantly changed depending on the PTRS density.

Figure 7:
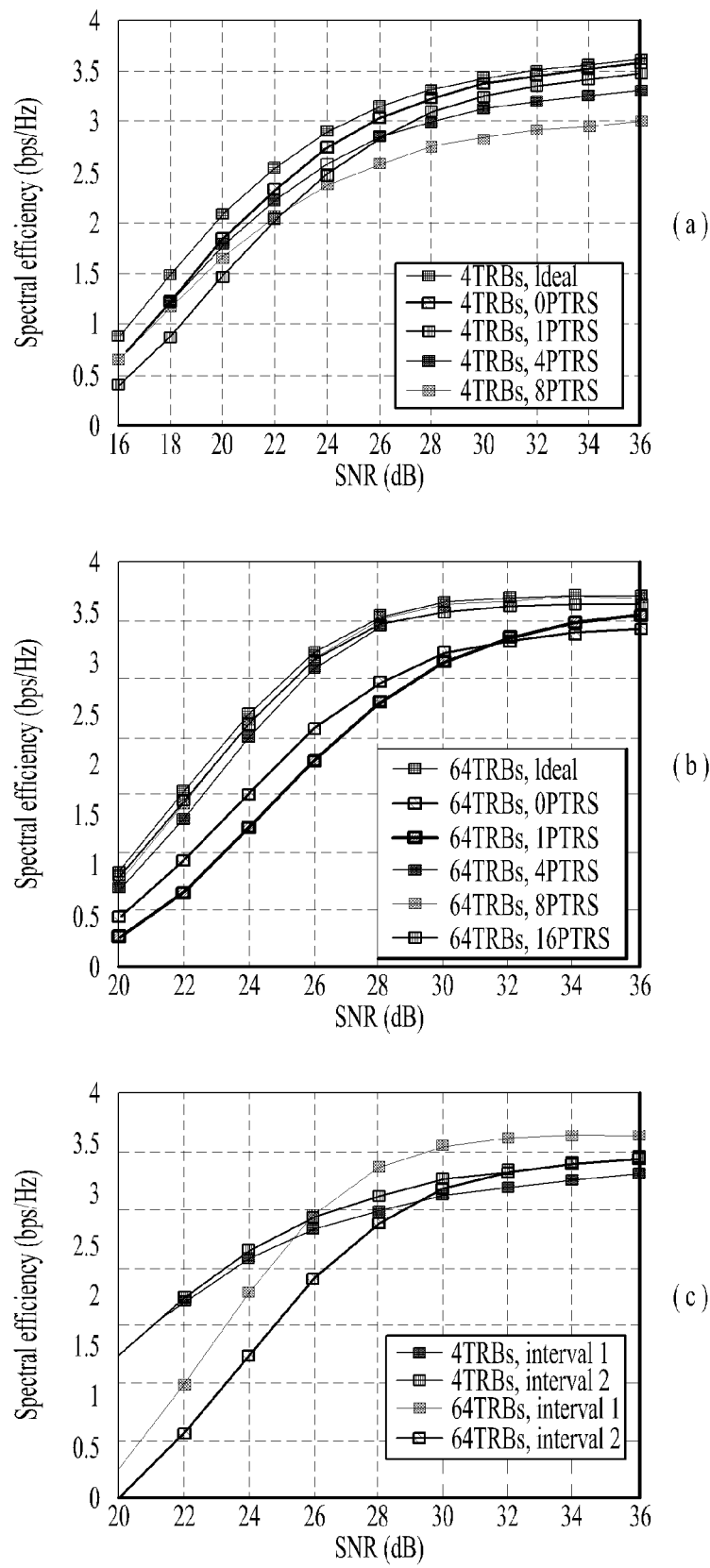
FIG. 7 is a diagram illustrating spectral efficiency for PTRS density based on different TRB sizes.

FIG. 7 is a diagram illustrating spectral efficiency for PTRS density based on different TRB sizes.

FIG. 7(a) shows spectral efficiency depending on the number of PTRSs when the TRB size is 4. Referring to FIG. 7(a), it may be seen that when the TRB size is 4, the spectral efficiency when no CPE compensation is performed is higher than that when the CPE compensation is performed based on some PTRSs. When the TRB size is 4, one code block may be defined for a codeword. In addition, since a code block is spread out in a subframe, the impact of the phase noise may be reduced. In this case, if the TRB size is small, the CPE compensation may not be significantly affected as described in FIG. 4(a). Meanwhile, since the size of information increases as the number of PTRSs increases, throughput loss may occur due to a portion to which the PTRSs are allocated. In addition, when the TRB size is small, the amount of throughput loss may be greater than the amount of gain obtained from the CPE compensation, and thus the PTRS may be required no longer.

Referring to FIG. 7(b), it may be seen that when the TRB size is 64, the spectral efficiency is close to an ideal level as the number of PTRSs increases. When the TRB size is large, a plurality of code blocks may be defined for one codeword and each code block is spread out in one or two OFDM symbols. As a result, the impact of the phase noise may increase. That is, when the phase noise increases in a specific OFDM symbol, it may be difficult to successfully decode a code block located in the specific OFDM symbol. This may be similar to FIG. 4(b). In other words, as the TRB size increases, the phase noise impact increases and overhead caused by the PTRS relatively decreases. Thus, when the number of PTRSs increase, throughput may be improved.

FIG. 7(c) shows the effect of changes in the PTRS density in the time domain, and it may be similar to FIG. 6. That is, when the TRB size decreases, the PTRS time density may not significantly affect the throughput. However, as described above, when the TRB size increases, the throughput may vary significantly depending on the PTRS time density.

Figure 8:
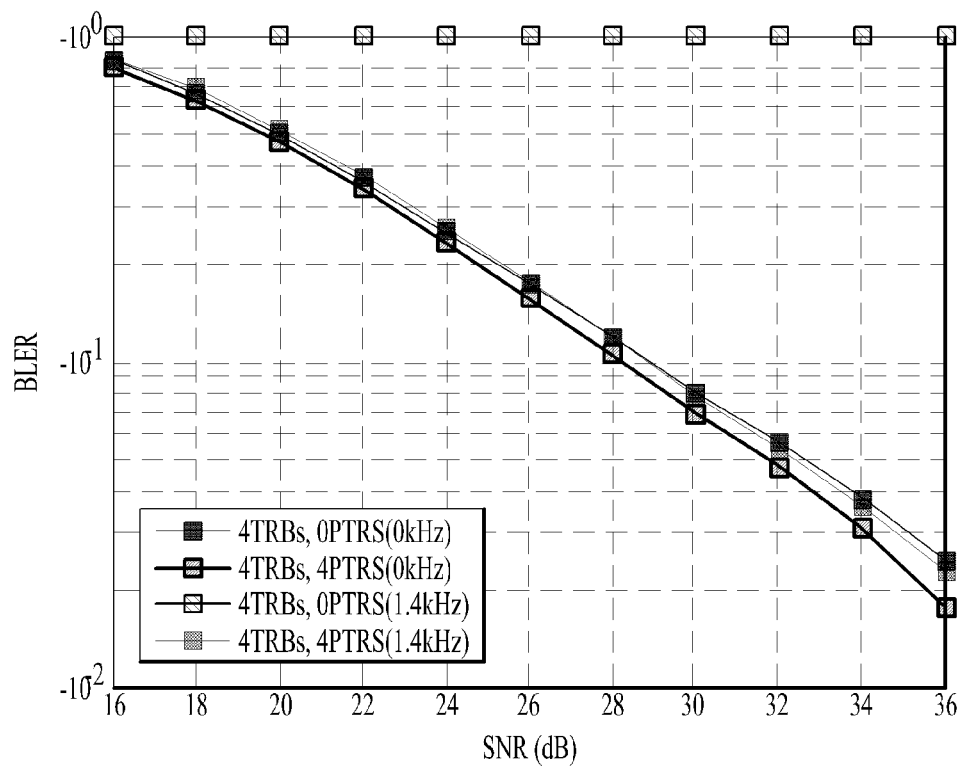
FIG. 8 is a diagram illustrating BLER performance depending on carrier frequency offset (CFO).

FIG. 8 is a diagram illustrating BLER performance depending on carrier frequency offset (CFO).

As described above, the PTRS may be unnecessary when the TRB size is small. However, even when the TRB size is small, the PTRS may be required due to CFO caused by an oscillator error and the Doppler Effect. Referring to FIG. 8, it may be seen that in the case of CFO=1.4 kHz, the BLER performance is degraded even through the TRB size is small, for example, 4. In this case, considering that the CFO between a BS and a UE is about ±0.1 ppm, the maximum CFO at 30 GHz may be 3 kHz. That, when high frequency is used, the CFO may significantly affect the BLER performance Therefore, the number of PTRSs should be determined in consideration of the CPE compensation and PTRS overhead, which are in a trade-off relationship, and it will be described later.

Figure 9:
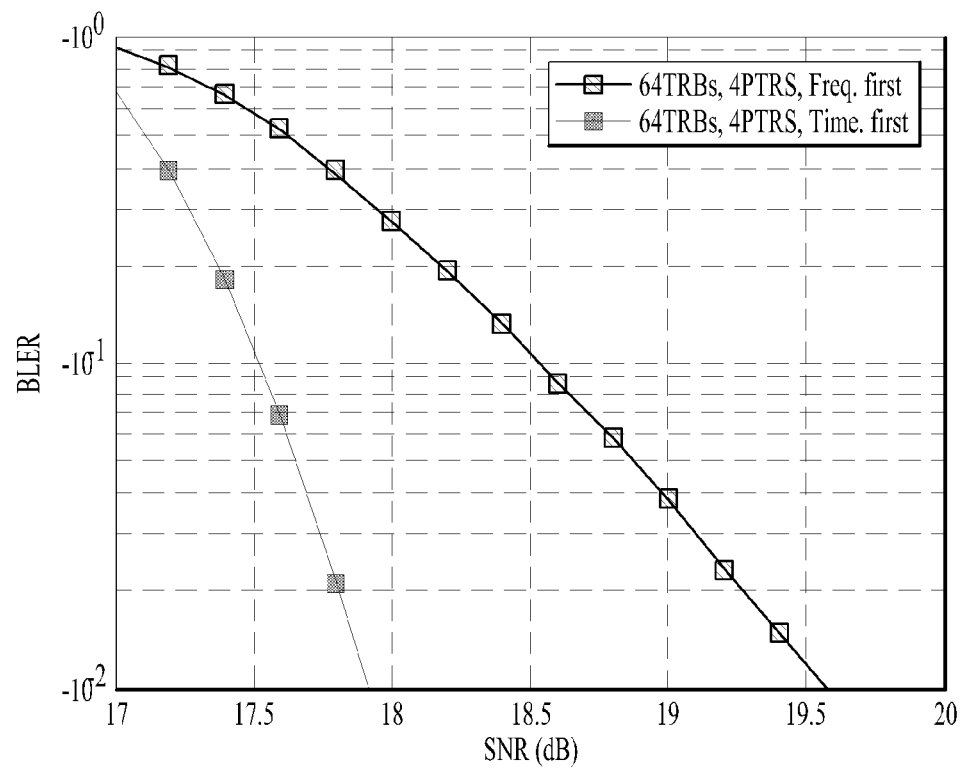
FIG. 9 is a diagram illustrating BLER performance depending on PTRS mapping orders in the time and frequency domains.

FIG. 9 is a diagram illustrating BLER performance depending on PTRS mapping orders in the time and frequency domains.

FIG. 9 shows a case in which the PTRS is first mapped in the time domain and a case in which the PTRS is first mapped in the frequency domain Referring to FIG. 9, it may be seen that the case where the PTRS is first mapped in the time domain has better BLER performance than the case where the PTRS is first mapped in the frequency domain. This is because of the aforementioned ICI. That is, since when the code block is spread out in the time domain, the phase noise impact is reduced, and as a result, the graph shown in FIG. 9 may be obtained. In addition, this also may imply that code block spreading in the time domain is effective in reducing the phase noise.

Proposal 1 (Fixing the Number of PTRSs in the Frequency Domain)

Referring to FIGS. 4 to 9, the number of PTRSs in the frequency domain may be limited to a certain value. Specifically, it may be seen from the drawings that when the number of PTRSs in the frequency domain is 4 or 8, a BLER performance curve approaches that of the ideal case. That is, the number of PTRSs in the frequency domain may be determined regardless of the number of TRBs (or the TRB size). Thus, the number of PTRSs in the frequency domain may be fixed to a specific value regardless of the number of TRBs.

Specifically, when the number of PTRSs in the frequency domain is defined as N, N may be determined according to the following methods.

1. N may be determined as 4 or 8 regardless of the number of TRBs (N may be defined as a rule in the specification).
2. The value of N may be informed through RRC and/or DCI.

That is, the number of PTRSs in the frequency domain may be determined as a predetermined specific value, for example, 4 or 8. As another example, the number of PTRSs in the frequency domain may be informed through RRC or DCI in advance. The above-described methods may be used by considering overhead caused by the PTRS as a reference signal.

For example, the number of PTRSs in the frequency domain may be 4. In this case, a distributed type of PTRS or a localized type of PTRS may be used. For example, the distributed type of PTRS is designed to obtain uniform frequency spacing between PTRSs within a given TRB. On the other hand, the localized type of PTRS is designed to locate the PTRS at the center of a given TBS or at a specific position.

A BS may inform a UE whether the distributed type of PTRS or the localized type of PTRS is used through RRC and/or DCI. Alternatively, one of the two types may be defined as a predetermined arrangement method (i.e., it may be defined as a rule in the specification). In the case of uplink transmission, it may be transmitted in control information, or a predetermined arrangement method may be used. However, the present disclosure is not limited thereto.

The above value may correspond to the maximum number of PTRSs in the frequency domain configured for the UE. When the maximum number of PTRSs is 8, if the UE is allocated 8 PRBs, the UE defines only the 8 PTRSs in a bandwidth. In the case of uniform distribution, one PTRS may be defined for each RB.

On the other hand, if the UE is allocated 32 PRBs, the UE defines one PTRS for every four RBs. Further, if the UE is allocated 16 PRBs, the UE defines one PTRS for every two RBs. That is, when the maximum number of PTRSs is 8, 8 PTRSs may be uniformly distributed based on the number of PRBs The maximum number of PTRSs may vary depending on the allocated bandwidth. This is because as the bandwidth decreases, the sensitivity to the phase noise decreases. That is, in the case of BW (bandwidth)<=8 PRBs, the maximum number of PTRSs may be set to 4. On the contrary, in the case of BW>8 PRBs, the maximum number of PTRSs may be set to 8.

Consequently, the UE may determine the frequency-domain location (or pattern) of the PTRS based on at least one of the allocated BW or the maximum number of PTRSs allowed in the corresponding BW.

Meanwhile, the starting location of each PTRS may be set to an RB with the lowest index among given RBs. On the other hand, the BS may preconfigure the starting location UE—specifically through at least one of RRC and/or MAC-CE in advance. However, the UE may determine whether to transmit the PTRS or data at the PTRS location configured by the BS based on at least one of subcarrier spacing, MCS and/or BW. In addition, if the corresponding region is set for a zero power PTRS (ZP-PTRS), the UE may transmit no data in the corresponding region.

As another example, the number of PTRSs in the frequency domain may be changed by considering the number of TRBs (or TRB size). This is because ICI caused by CFO degrades CFO and CPE estimation performance. In this case, as shown in the drawings, the degradation of the estimation performance may further degrade the BLER performance if the number of TRBs increases. However, since reference signal overhead may decrease as the number of TRBs increases, it is possible to improve the estimation performance by allocating more PTRSs in the frequency domain. That is, the number of PTRSs in the frequency domain may be determined based on the number of TRBs by considering the BLER performance degradation and PTRS overhead. For example, the number of PTRSs may be defined as shown in Table 4. According to Table 4, when the number of TRBs (or TRB size) is less than or equal to than N, the number of PTRSs in the frequency domain may be set to M1. On the contrary, when the number of TRBs is more than N, the number of PTRSs in the frequency domain may be set to M2. For instance, the reference number of TRBs may be 8. In addition, M1 and M2 may be 4 and 8, respectively. However, the present disclosure is not limited thereto. That is, N, M1, and M2 may set to other specific values.

Additionally, N, M1, and M2 may be configured through RRC and/or DCI. Further, N, M1, and M2 may be predetermined (i.e., the values thereof may be defined as a rule in the specification).

TABLE 4

If TRB size <= N (e.g. 8),
   # of PTRS in the frequency domain = M1 (e.g.4);
Else,
   # of PTRS in the frequency domain = M2 (e.g.8)

Meanwhile, the UE may report an offset value for the above-described value to the BS. That is, since each UE has a different PN state, the transition point may not be suitable. Thus, offset reporting may be required to compensate for the non-suitable transition point. For example, a 1-bit offset capable of switching the TRB size configured in the above example from 8 to 4 or 16 may be defined. Meanwhile, in the following description, the PTRS time/frequency pattern (including whether the PTRS is transmitted or not) vary according to subcarrier spacing/MCS/BW, and in this case, a reporting mode capable of changing each of the three conditions may be defined. At this time, the reporting mode may directly indicate a desired value or give an offset for the exiting value. The former case requires more bits but may represent various values.

Proposal 2 (Changing the Interval Between PTRSs in the Time Domain Depending on the TRB Size)

The PTRS frequency density (FD) may be defined as shown in Table 5 below. For example, no PTRS may be allocated when the number of RBs is less than or equal to 4. In addition, the PTRS may be allocated to one subcarrier when the number of RBs is more than 5 and less than or equal to 8. That is, the FD may be 1. Moreover, the PTRS may be allocated to one subcarrier for every two RBs when the number of RBs is more than 9 and less than or equal to 16. That is, the FD may be ½. Further, the PTRS may be allocated to one subcarrier for every four RBs when the number of RBs is more than 17 and less than or equal to 32. That is, the FD may be ¼.

TABLE 5

| Scheduled BW | Frequency density |
|---|---|
| $0 < N_{RB} <= 4$ | No PT-RS |
| $5 < N_{RB} <= 8$ | 1 |
| $9 < N_{RB} <= 16$ | ½ |
| $17 < N_{RB} <= 32$ | ¼ |

However, according to Table 5, the number of PTRS subcarriers may decrease at the boundary of the FD. Comparing a case in which the scheduled BW is 8 and a case in which the scheduled BW is 9, the PTRS may be allocated to one subcarrier in each RB when the number of RBs is 8, but the PTRS may be allocated one subcarrier in every two RBs when the number of RBs is 9. When there are 8 RBs, the number of PTRS subcarriers may be 8, and when there are 9 RBs, the number of PTRS subcarriers may be 4. FIG. 10 shows an example for Table 5. For example, if the number of PTRS subcarriers is sharply changed at the boundary of each RB number, the number of PTRS subcarriers may be sharply changed at a specific PRB as shown in 'Table B' of FIG. 10. Meanwhile, FIG. 11 shows spectral efficiency when there are 64 PRBs. In this case, it may be seen that performance is significantly changed depending on the number of PTRSs in the case of a specific PN model and the best performance is obtained when the number of PTRSs is 16. Thus, when there are 64 PRBs, 16 PTRSs may be required. Details will be described later with FD determination.

Figure 12:
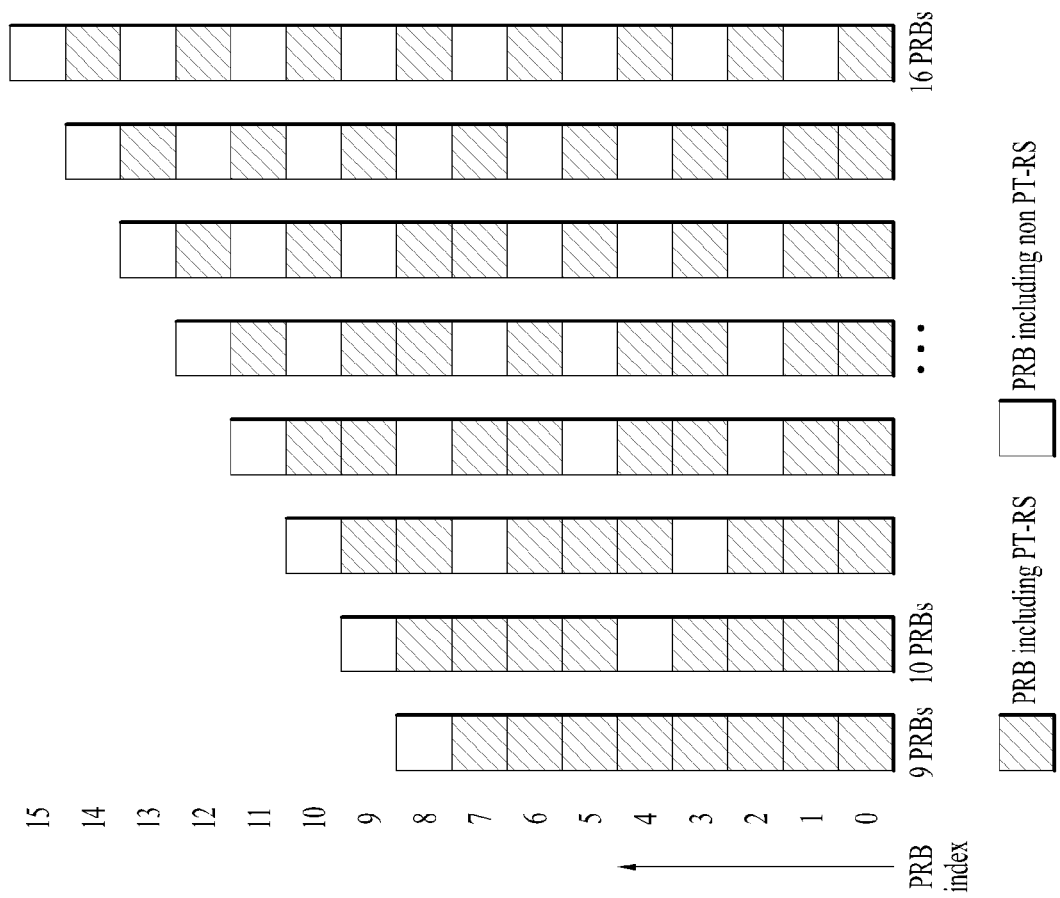
FIG. 12 is a diagram illustrating a PTRS allocation method.

As described above, the PTRS density may decrease as the BW increases. As the BW becomes larger, the BLER performance may be more sensitive to the number of PTRS subcarriers. Thus, the number of PTRS subcarriers needs to be adjusted by considering an increase in BW. For example, when the FD is less than 1, the PTRS may be allocated according to Equation 2. In Equation 2, i denotes the index of a PRB including the PTRS, P denotes the number of allocated PRBs, and k denotes an offset value therefor. When the number of RBs is more than 9 and less than or equal to 16, the number of PTRS carriers may increase according to Equation 2. FIG. 12 shows an example thereof. Referring to FIG. 12, L may be 8 when 9 PRBs are used. When the number of RBs is more than 9 and less than or equal to 16, the number of RBs including the PTRS may be maintained as 8 according to Equation 2. The FD may decrease as the number of RBs increases. Thus, it is possible to prevent the FD from decreasing at the boundaries shown in Table 5.

$$i = \left\lfloor l\frac{P}{L} \right\rfloor + k, l = 0, 1, \ldots, L-1 \quad \text{[Equation 2]}$$

In this way, Table 5 may be modified to Table 6. If P is more than 8, L may be set to 8. However, this is merely exemplary, and the present disclosure is not limited thereto. In addition, 'Table A' of FIG. 10 may indicate that the number of PTRSs increases in a similar way as shown in Table 6 below.

TABLE 6

| Scheduled BW | Frequency density |
|---|---|
| $0 < N_{RB} <= 4$ | No PT-RS |
| $5 < N_{RB} <= 8$ | 1 |
| $9 < N_{RB}$ | $L/N_{RB}$ |

Equation 2 may not only prevent a decrease in the FD but also allow uniform distribution of PTRS subcarriers. However, the present disclosure is not limited thereto. As another example, Equation 2 for representing the index of the PRB including the PTRS may be modified as follows. For example, although rounding down is used in Equation 2, rounding off or up may be used as shown in Equation 3, instead of rounding up.

$$i = \left\lceil l\frac{P}{L} \right\rceil + k, l = 0, 1, \ldots, L-1 \quad \text{[Equation 3]}$$

In Equation 2 or 3, the value of L may vary for each BW. This is because as the BW increases, the number of required PTRSs (L) may increase. Considering this fact, the values of L may be defined as shown in Table 7 below.

TABLE 7

| Scheduled BW | Frequency density |
|---|---|
| $0 < N_{RB} <= BW_1$ | No PT-RS |
| $BW_1 < N_{RB} <= BW_2$ | 1 or $L_1/N_{RB}$ |
| $BW_2 < N_{RB} <= BW_3$ | $L_2/N_{RB}$ |
| ... | ... |
| $BW_{N-1} < N_{RB} <= BW_N$ | $L_{N-1}/N_{RB}$ |

Table 7 may be modified to Table 8. Referring to Table 8, the values of L may be configured by a UE and/or a BS (e.g., gNB) through at least one of RRC, MAC-CE, and/or DCI. Since each UE has a different phase noise spectrum, if a UE has a relatively low phase noise, the UE may set a relatively low value for L. On the other hand, if the UE has a relatively high phase noise, the UE may set a relatively high value for L. When the performance of UEs is generally improved, the BS may adjust these values to support forward compatibility. However, the present disclosure is not limited thereto.

TABLE 8

| Scheduled BW | # of PTRS subcarriers |
|---|---|
| $N_{RB} < BW_1$ | No PT-RS |
| $BW_1 <= N_{RB} < BW_2$ | 1 or $L_1$ |
| $BW_2 <= N_{RB} < BW_3$ | $L_2$ |
| ... | ... |
| $BW_N <= N_{RB}$ | $L_N$ |

To adjust the values, relative locations may be provided with respect to the original locations. It is assumed that one bit is used as a configuration bit and the current density is L2. In this case, if the bit is 0, L2 may be maintained. If the bit is 1, L2 may be changed to L3 (density reduction). However, the present disclosure is not limited thereto. When the configuration bit is used, Table 8 may be modified to Table 9 with respect to the full BW. That is, the values of L may be uniformly shifted as shown in Table 9, and as a result, the density may be reduced.

TABLE 9

| $BW_1 <= N_{RB} < BW_2$ | 1 or $L_0$ |
|---|---|
| $BW_2 <= N_{RB} < BW_2$ | $L_1$ |
| ... | ... |
| $BW_N <= N_{RB}$ | $L_{N-1}$ |

Meanwhile, when the number of PTRSs defined in the frequency domain is more than a predetermined value, an increase in the number of PTRSs may increase overhead instead of improving performance, thereby incurring a loss in terms of spectral efficiency. Therefore, the relationship shown in Equation 4 may be established.

$$L_2 \leq L_2 \ldots \leq L_{N-1} \quad \text{[Equation 4]}$$

A virtual PRB index may be applied to the above equations. That is, even when PRBs are not actually contiguous, the PTRS frequency location may be determined by applying the virtual PRB index to the equations.

The PRB index may be determined by changing a real PRB location to a virtual PRB location, but the present disclosure is not limited thereto. For example, assuming that the indices of allocated physical PRBs are PRBs #10 to #15 and PRBs #30 to #39, the indices may be changed to vPRBs #0 to #15. The calculation may be performed with respect to the vPRB. The indices of the physical PRBs in which the PTRS is transmitted may be determined as follows: 10 is added in the case of vPRBs #0 to #5 and 24 is added in the case of vPRBs #6 to #15. However, the present disclosure is not limited thereto.

In the above equations, k may be defined as 0. If no PTRS location is detected from a PRB, a region for detecting the location of the PTRS may be extended to before a PRB including a next PTRS. Assuming that no PTRS is detected from PRB 0 among 16 PRBs in the above tables, the PTRS location detection may be attempted in PRB 1. Meanwhile, the basic PTRS location may be set to the location of a DMRS with the lowest frequency index in a specific PRB. If the basic PTRS location is set to the location of a DRMS with the highest frequency index in the specific PRB, k may be set to 1. In this case, Equation 2 may be modified to Equation 5.

$$i = \left\lfloor l\frac{P}{L} \right\rfloor + k + p_0, l = 0, 1, \ldots, L-1 \qquad \text{[Equation 5]}$$

In Equation 5, Po denotes the lowest index among actually allocated physical PRBs. In addition, Equation 5 may be useful when all allocated PRBs are contiguous.

Figure 13:
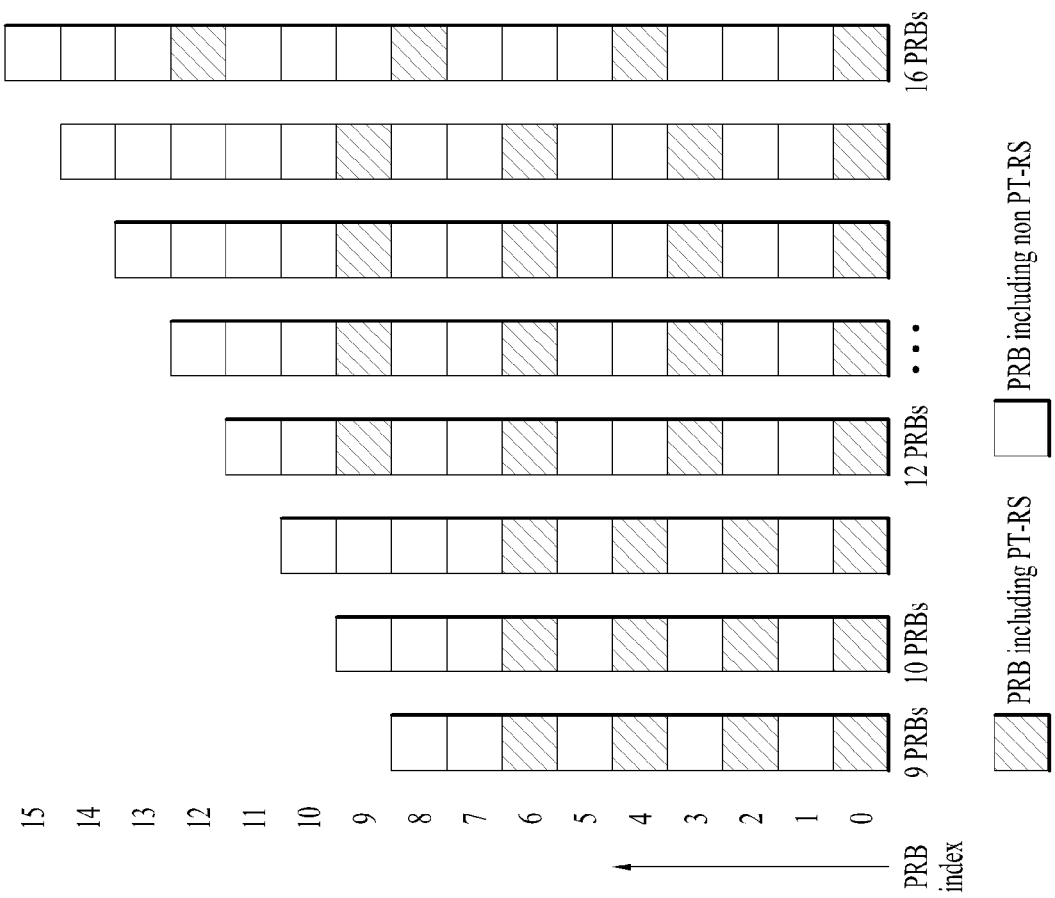
FIG. 13 is a diagram illustrating a PTRS allocation method.

In addition, Equation 2 may be modified to Equation 6. Due to $$\left\lfloor \frac{P}{L} \right\rfloor$$

of Equation 6, a distance between adjacent PTRSs in the frequency domain may be fixed. For example, the PTRS density may be defined as shown in Table 10 below. Referring to Table 8, L may be equal to 4 in the case of 8<P≤16 Thus, the PTRS may be located as shown in FIG. 13. In other words, the frequency-domain location may be fixed, and as a result, implementation may be simplified. For example, when there are 9 to 11 PRBs, the PTRS interval may correspond to two PRBs. When there are 12 to 15 PRBs, the PTRS interval may be set to three PRBs. That is, since the frequency-domain location is fixed, the interval may be fixed depending on the number of PRBs. However, compared to Equation 2, Equation 6 may not be suitable for uniformly distributing the PTRS in a specific BW. Therefore, the PTRS needs to be arranged by considering Equation 2 or 6 depending on cases.

$$i = l\left\lfloor \frac{P}{L} \right\rfloor + k, l = 0, 1, \ldots, L-1 \qquad \text{[Equation 6]}$$

TABLE 10

| Scheduled BW | Frequency density |
|---|---|
| $N_{RB} < 4$ | 1 |
| $4 \leq N_{RB} < 16$ | $4/N_{RB}$ |
| $16 \leq N_{RB} < 48$ | $8/N_{RB}$ |
| $48 \leq N_{RB} < 64$ | $12/N_{RB}$ |
| $64 \leq N_{RB}$ | $16/N_{RB}$ |

Figure 14:
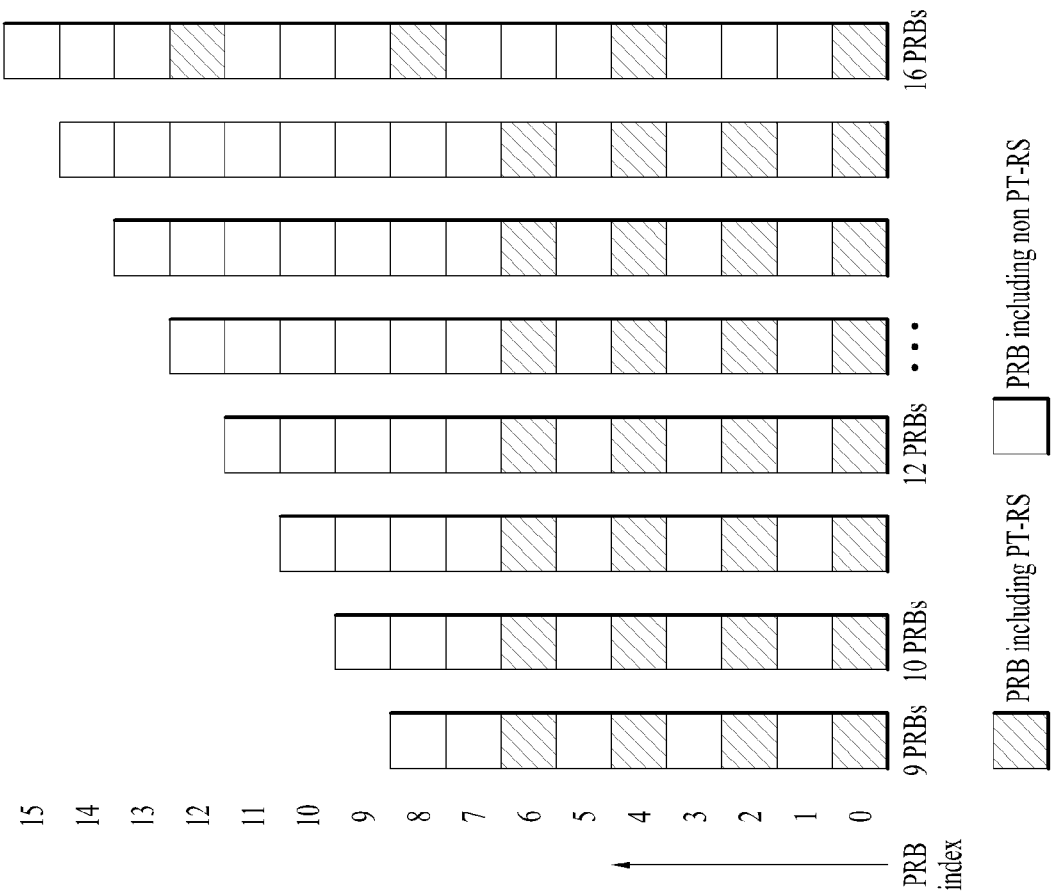
FIG. 14 is a diagram illustrating a PTRS allocation method.

Additionally, the above equation may be modified to Equation 7. In Equation 7, the PTRS frequency-domain interval is denoted by T unlike the other equations. When 8<P≤16 and L=4, the PTRS may be located as shown in FIG. 14. Referring to FIG. 14, the PTRS interval may correspond to two or four PRBs. When there are 15 PRBs or less, if two resource block groups (RBGs) exist, one PTRS may be defined for each RBG. In addition, when there are 16 PRBs, if four RBGs exist, one PTRS may be defined for each RBG. Moreover, in this case, if two PRGs exist, one PTRS may be defined for every two PRGs. That is, the PTRS may be defined on a PRG basis, and thus, implementation may be simplified. However, the above-described method may not be suitable for uniformly distributing the PTRS in a given bandwidth. To solve this issue, one PTRS may be defined for every two or four PRBs, and by doing so, the PTRS may be distributed more uniformly.

$$i = lT + k, l = 0, 1, \ldots, L-1 \qquad \text{[Equation 7]}$$

$$\text{where } T = \underset{t \in C, t \geq \left\lfloor \frac{P}{L} \right\rfloor}{\operatorname{argmin}} \left( t - \left\lfloor \frac{P}{L} \right\rfloor \right)$$

$$\text{where } C = \{1, 2, 4, 8, 16, 32\}$$

In the above equations, the value of k may be changed depending on PTRS port numbers. For example, in the case of PTRS ports #0 and #1, the value of k may be set to 0 and 1, respectively. In this case, different PTRS ports may be located in different PRBs. However, this may be useful only when the FD is less than or equal to ½. Otherwise, the same PTRS port may exist in the same PRB. That is, only when the FD is less than or equal to ½, the value of k may be changed depending on PTRS port numbers. However, the present disclosure is not limited thereto.

In DFT-s-OFDM, when a plurality of PTRSs are allocated to one OFDM symbol, the number of PTRSs may be determined depending on BW according to the above equations. In addition, the location of the PTRS in the time and frequency domains may be determined based on the above tables.

In the DFT-s-OFDM, the number of PTRSs defined in one OFDM symbol may be changed depending on the BW. Since the CPE estimation performance becomes more sensitive as the BW increases, the number of PTRSs should be increased when the BW increases.

If a post-DFT based PTRS is defined for the DFT-s-OFDM, the PTRS may be defined in the frequency domain in the same way as in CP-OFDM. In this case, tables and equations for the CP-OFDM may be reused.

Figure 16:
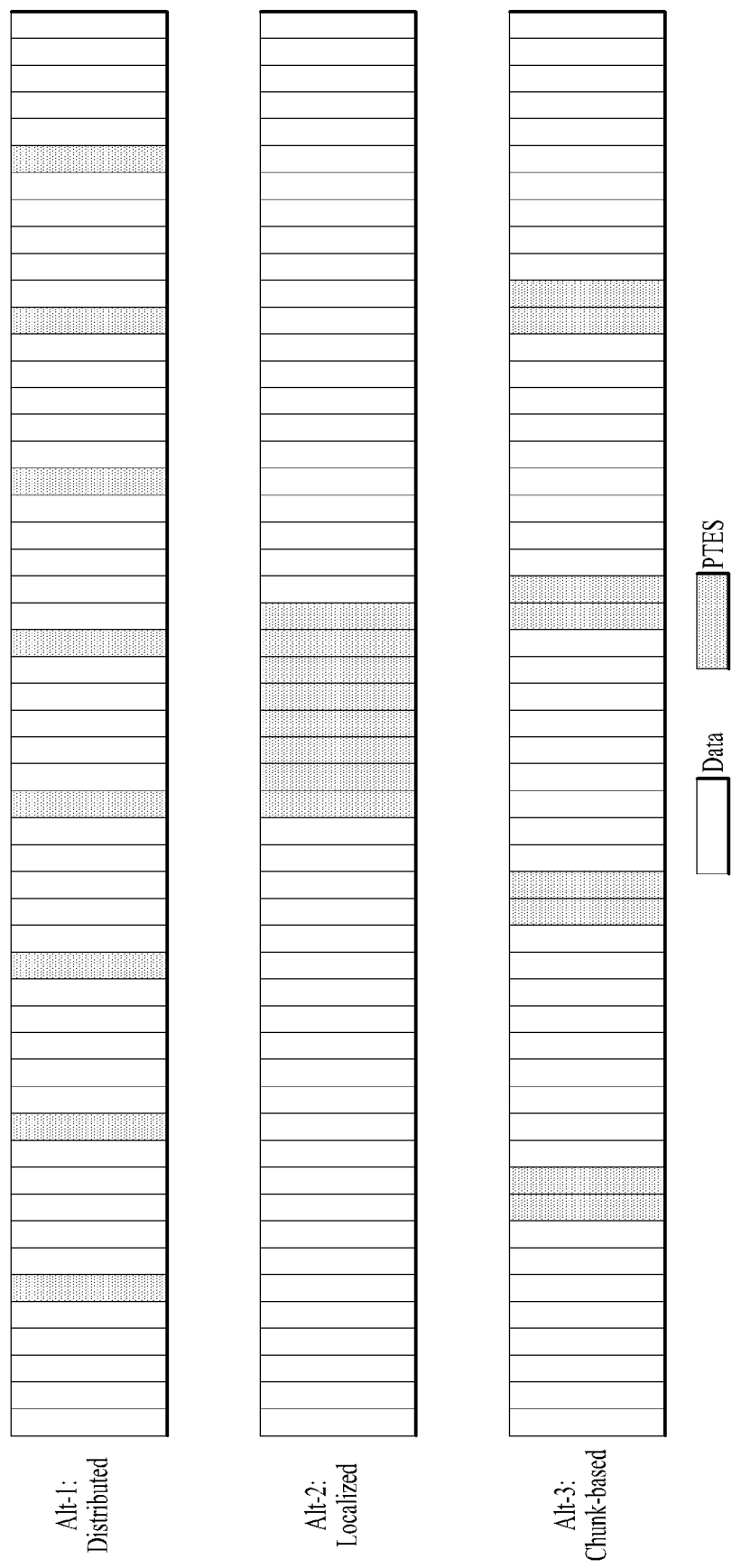
FIG. 16 is a diagram illustrating a PTRS allocation method.

In addition, if a pre-DFT based PTRS is defined for the DFT-s-OFDM, the PTRS may be defined in the time domain as shown in FIG. 16. In FIG. 16, "chunk" means an adjacent PTRS group in the time domain. In Alt-3 of FIG. 16, it is assumed that there are four chunks and each of which has a size of 2.

If Alt-1 or Alt-3 of FIG. 16 is applied, the PTRS may be uniformly distributed in the time domain. Thus, the equations used for the CP-OFDM may be equally used. In the case of Alt-1 of FIG. 16, L in the equations may mean the total number of PTRSs (per OFDM). On the other hand, in the case of Alt-3 of FIG. 16, L may mean the total number of PTRSs (per OFDM/chunk size). Consequently, L=8 in Alt-1 but L=4 in Alt-3. In other words, according to Alt-3 of FIG. 16, the above equations may indicate the location of each chunk rather than the PT-RS location. However, the present disclosure is not limited thereto.

FIGS. 17 to 20 illustrate experimental data depending on the PRB size and the number of PTRSs. The data depending on the PRB size and the number of PTRSs shown in FIGS. 17 to 20 may be expressed as shown in Tables 7 to 11. In addition, Table 11 may be modified to Table 12. However, the present disclosure is not limited thereto.

TABLE 11

| Scheduled BW | # of PTRS subcarriers |
| --- | --- |
| $N_{RB} < 8$ | Frequency density: 1 |
| $8 <= N_{RB} < 32$ | 8 |
| $32 <= N_{RB} < 48$ | 12 |
| $48 <= N_{RB} < 64$ | 16 |
| $64 <= N_{RB} < 80$ | 20 |
| $80 <= N_{RB}$ | 24 |

TABLE 12

| Scheduled BW | Frequency density |
| --- | --- |
| $N_{RB} < 8$ | 1 |
| $8 <= N_{RB} < 32$ | $8/N_{RB}$ |
| $32 <= N_{RB}$ | ¼ |

As described above, the interval between adjacent PTRSs in the frequency domain may be set to one of 1, 2, 4, and 8 PRBs. In this case, the RBG may be related to with the PTRS as described above, and by doing so, one PTRS may be defined for each RBG. That is, as described above, if the RBG is defined as a minimum scheduling unit, ambiguity about the PTRS arrangement may be cleared even though non-consecutive scheduling is performed. When the PTRS is distributed on an RBG basis, the FD may be determined as shown in Table 13. For example, if the number of RBs is less than 4, the FD may be set to 1. If the number of RBs is more than or equal to 4 and less than 16, the FD may be set to 4/NRB. If the number of RBs is more than or equal to 16, the FD may be set to ¼ regardless of the number of RBs. If one or more RBGs are added, one PTRS may be additionally allocated to maintain the FD.

Referring to Table 13, as the scheduled BW increases, more PTRSs may be defined. However, it may be seen from the experimental data that when the number of PTRS is more than or equal to a predetermined value, additional PTRSs are considered as a loss in terms of spectral efficiency. Accordingly, Table 13 may be redefined as shown in Table 14.

TABLE 13

| Scheduled BW | Frequency density |
| --- | --- |
| $N_{RB} < 4$ | 1 |
| $4 <= N_{RB} < 16$ | $4/N_{RB}$ |
| $16 <= N_{RB}$ | ¼ |

TABLE 14

| Scheduled BW | Frequency density |
| --- | --- |
| $N_{RB} < 4$ | 1 |
| $4 <= N_{RB} < 16$ | $4/N_{RB}$ |
| $16 <= N_{RB} < 64$ | ¼ |
| $64 <= N_{RB}$ | 16 |

Figure 21:
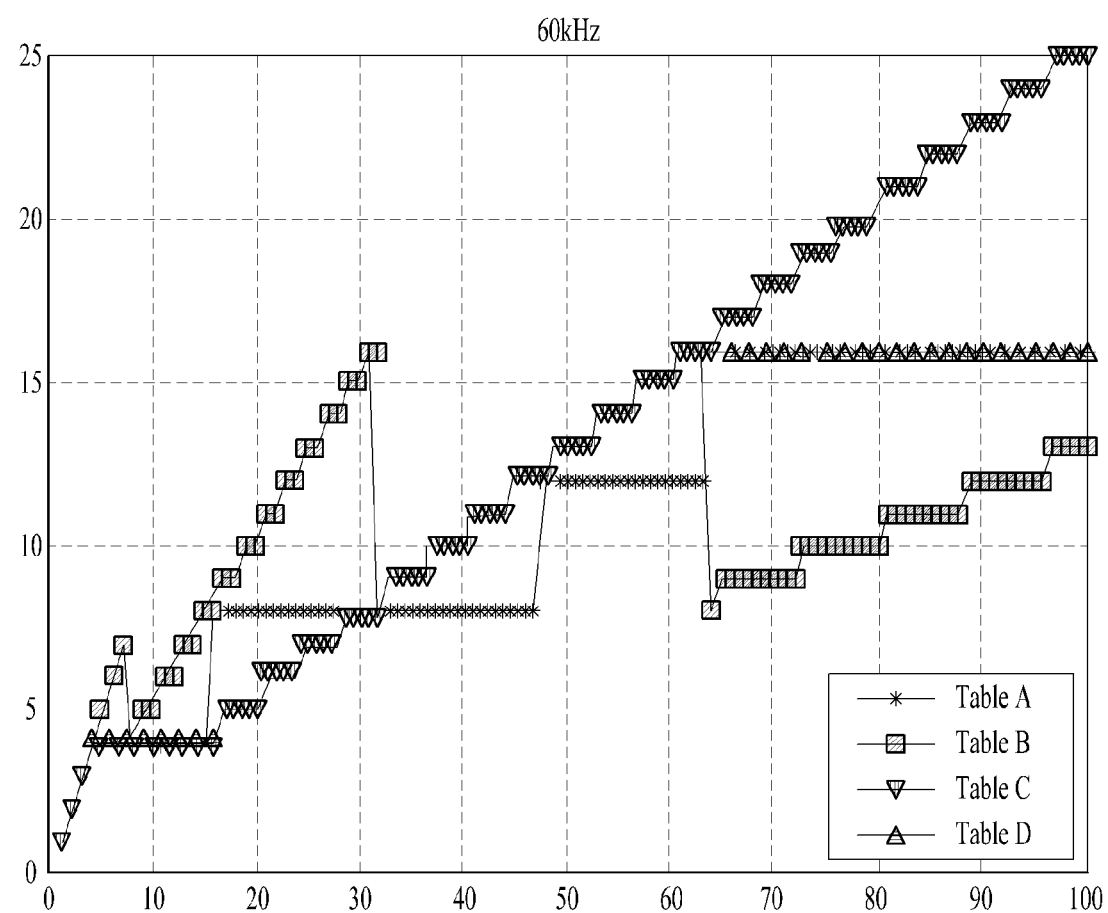
FIG. 21 is a diagram illustrating a PTRS allocation method.
Figure 22:
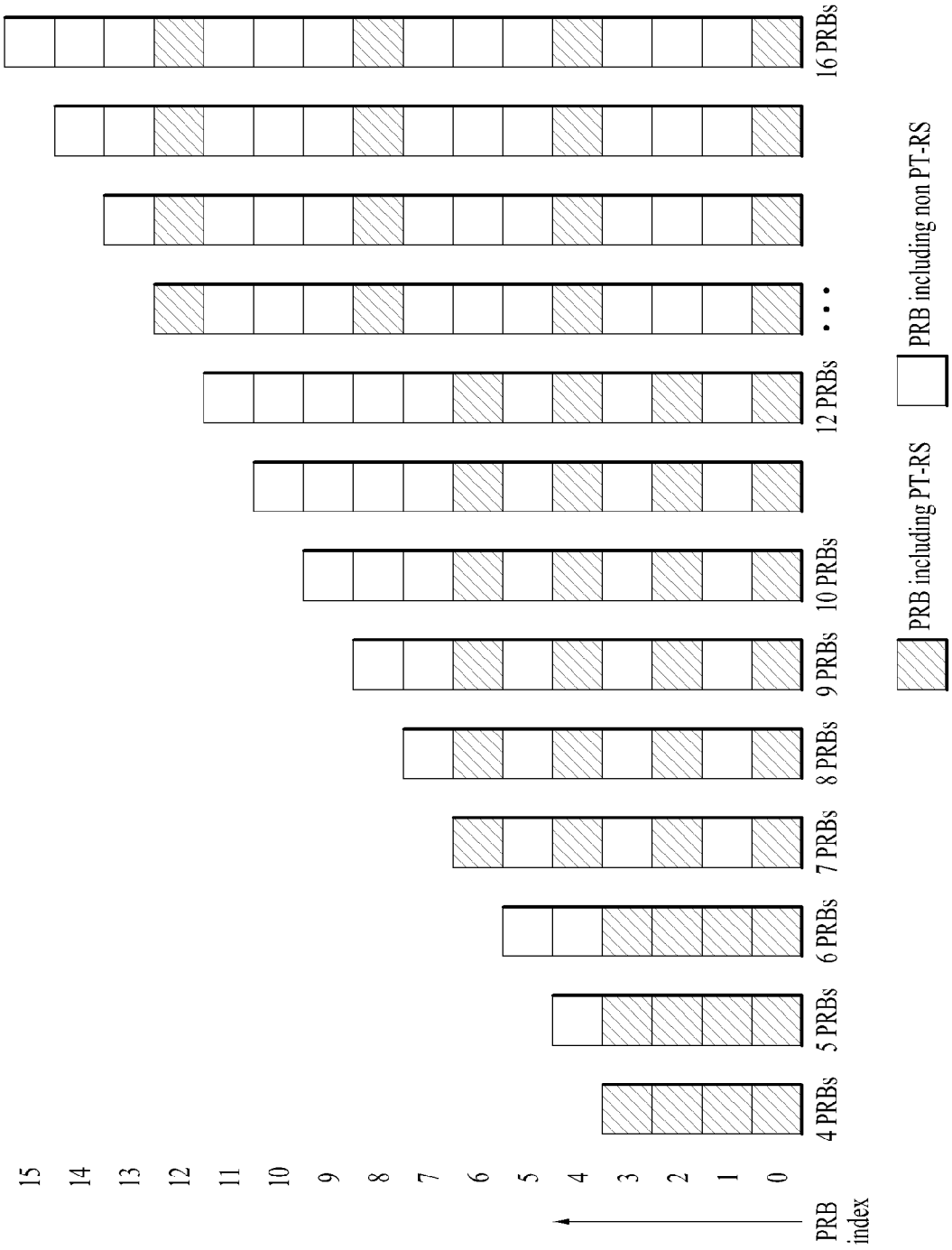
FIG. 22 is a diagram illustrating a PTRS allocation method.
Figure 23:
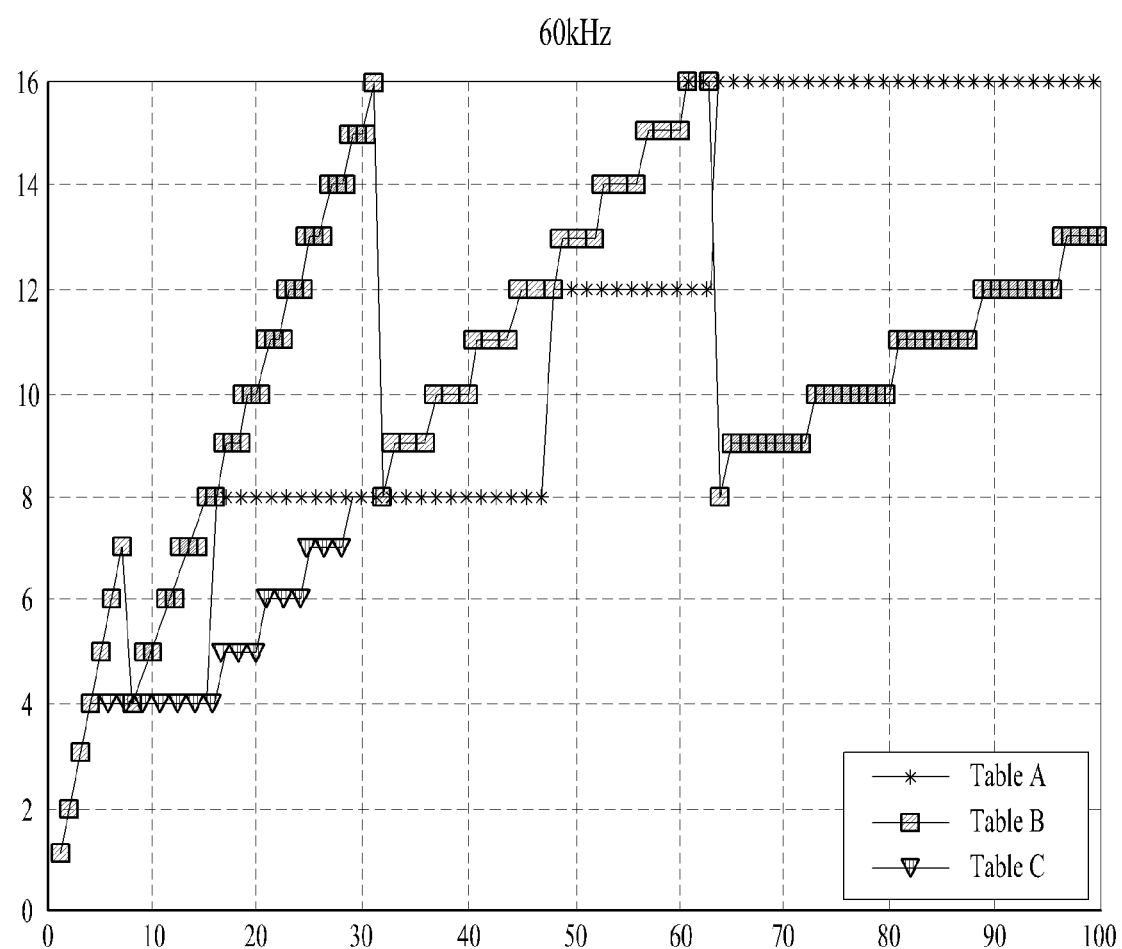
FIG. 23 is a diagram illustrating a PTRS allocation method.

In Table 13, when the number of RBs is more than or equal to 16 and less than or equal to 64, the FD may be maintained as ¼. However, when the number of RBs is more than or equal to 64, if the number of PTRSs is more than 16, there occur a loss as described above. Therefore, the number of PTRSs may be maintained as 16. FIG. 21 illustrates the number of PTRS depending on BW based on Table 14. Table 14 may correspond to 'Table D' of FIG. 21. That is, the number of PTRSs may not be sharply reduced at the RB boundary but gradually increased. When the RBG is considered, if the BW is more than or equal to 4 RBs and less than 16 RBs, the number of PTRSs may be maintained as 4. FIG. 22 illustrates the frequency location of a PRB including the PTRS when the number of RBs is more than or equal to 4 and less than or equal to 16. In FIG. 22, the PTRS interval may be assumed to be 1, 2, or 4 RBs, but the present disclosure is not limited thereto.

In Table 14 or 'Table D' of FIG. 21, when the BW is more than or equal to 64 RBs, the location of the PRB including the PTRS may be extended in the same way as described above. More specifically, in the case of BW=64PRBs, the PTRS may be defined for every 4 PRBs. Meanwhile, in the case of a higher BW (e.g., BW<=100PRBs), the PTRS may be defined in the same PRB location as in the case of BW=64PRBs. This is because the PTRS cannot be defined for every 8 PRBs when BW<=100PRBs. Meanwhile, when the BW corresponds to 101 PRBs or more, the PTRS may be defined for every 8 PRBs, and as a result, allocation may be performed in the same way as described above.

The maximum number of PTRSs may be limited by considering RS overhead as described above. Specifically, the FD may be determined depending on the BW as shown in Table 15 below, and the maximum number of PTRSs may be limited based thereon. In addition, Table 15 may be modified to Table 16 although they are somewhat similar to each other. When the number of RBs is less than or equal to 3, the FD may be set to 1, but the maximum number of PTRSs may be set to 0 to indicate that the PTRS is OFF.

TABLE 15

| Scheduled BW | Frequency density | The maximum possible number of PT-RS subcarriers |
| --- | --- | --- |
| $N_{RB} < 3$ | No PT-RS | 0 |
| $3 <= N_{RB} < 16$ | 1 | 4 |
| $16 <= N_{RB}$ | ¼ | 25 |

TABLE 16

| Scheduled BW | Frequency density | The maximum possible number of PT-RS subcarriers |
| --- | --- | --- |
| $N_{RB} < 3$ | 1 | 0 |
| $3 <= N_{RB} < 16$ | 1 | 4 |
| $16 <= N_{RB}$ | ¼ | 25 |

When the BW is more than or equal to 64 RBs, 16 PTRSs may be sufficient. This may also be checked from the experimental data. Thus, the maximum number of PTRSs may be defined as shown in Table 17 below. That is, when the number of RBs is more than or equal to 16, the maximum number of PTRSs may be limited to 16. In addition, Tables 17 and 18 may indicate the same case, but the present disclosure is not limited thereto.

TABLE 17

| Scheduled BW | Frequency density | The maximum possible number of PT-RS subcarriers |
| --- | --- | --- |
| $N_{RB} < 4$ | 1 | 4 |
| $4 <= N_{RB} < 16$ | 1 | 4 |
| $16 <= N_{RB}$ | ¼ | 16 |

TABLE 18

| Scheduled BW | Frequency density |
|---|---|
| $N_{RB} < 4$ | 1 |
| $4 <= N_{RB} < 16$ | $4/N_{RB}$ |
| $16 <= N_{RB} < 64$ | ¼ |
| $64 <= N_{RB}$ | 16 |

As one embodiment, Table 19 or 20 may be obtained in a similar manner as described above.

TABLE 19

| Scheduled BW | Frequency density | The maximum possible number of PT-RS subcarriers |
|---|---|---|
| NRB < 8 | 1 | 4 |
| 8 <= NRB < 16 | ½ | 4 |
| 16 <= NRB | ¼ | 16 |

TABLE 20

| Scheduled BW | Frequency density | The maximum possible number of PT-RS subcarriers |
|---|---|---|
| $N_{RB} < 3$ | 1 | 0 |
| $3 <= N_{RB} < 8$ | 1 | 4 |
| $8 <= N_{RB} < 16$ | ½ | 4 |
| $16 <= N_{RB}$ | ¼ | 16 |

FIG. 14 illustrates that PTRSs are mapped to RBs based on Tables 19 and 20. For example, in the case of 9 PRBs, the interval between RBs is 2, and four PTRSs are arranged. In this case, no PTRS is allocated to the 8th RB. As another example, in the case of 15 RBs, no PTRS is allocated to the 8th, 10th, 12th and 14th RBs. Consequently, RS overhead may be reduced by limiting the maximum number of PTRS subcarriers.

Figure 15:
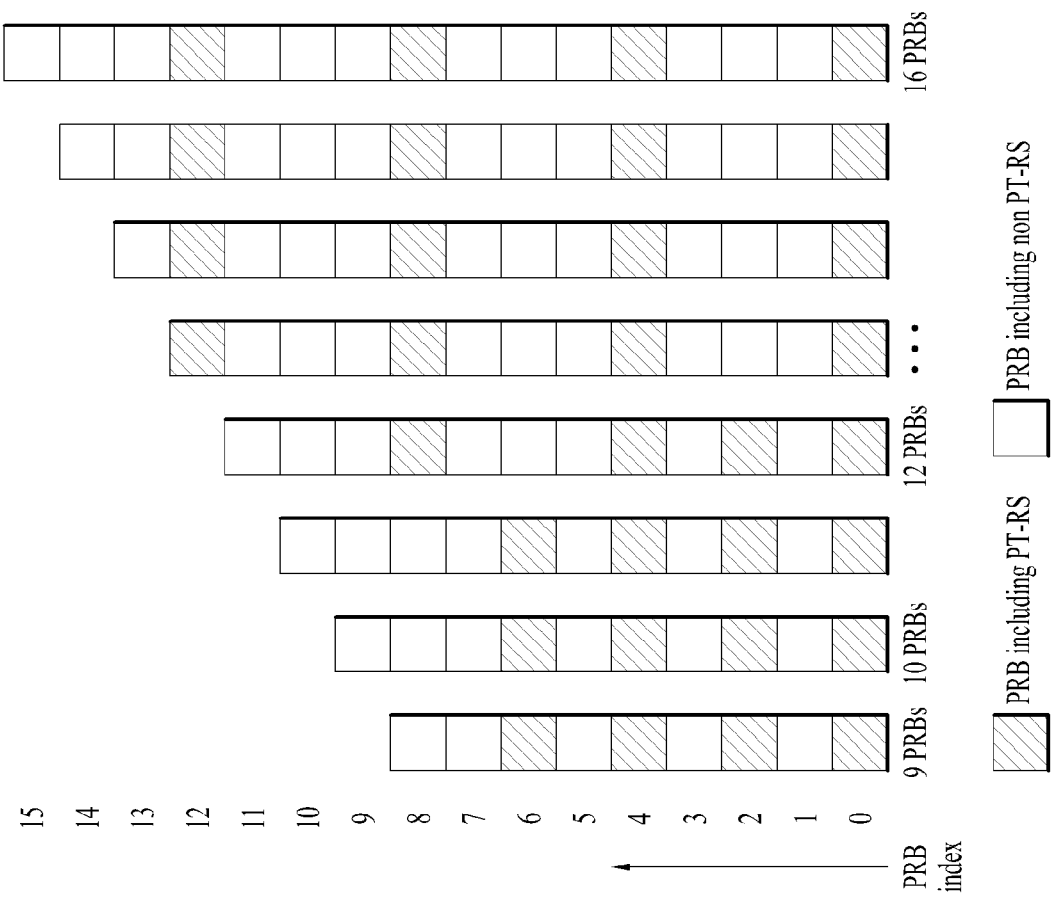
FIG. 15 is a diagram illustrating a PTRS allocation method.

Table 21 below shows an example in which the ½ density is applied to a case where the number of RBs is more than or equal to 8 and less than 12 rather than 16. FIG. 16 illustrates a method of mapping PTRSs to RBs based on Table 21. In FIG. 15, the PTRS may be distributed more uniformly in the frequency domain, compared to FIG. 14.

TABLE 21

| Scheduled BW | Frequency density | The maximum possible number of PT-RS subcarriers |
|---|---|---|
| $N_{RB} < 3$ | 1 | 0 |
| $3 <= N_{RB} < 8$ | 1 | 4 |
| $8 <= N_{RB} < 12$ | ½ | 4 |
| $12 <= N_{RB}$ | ¼ | 16 |

Figure 24:
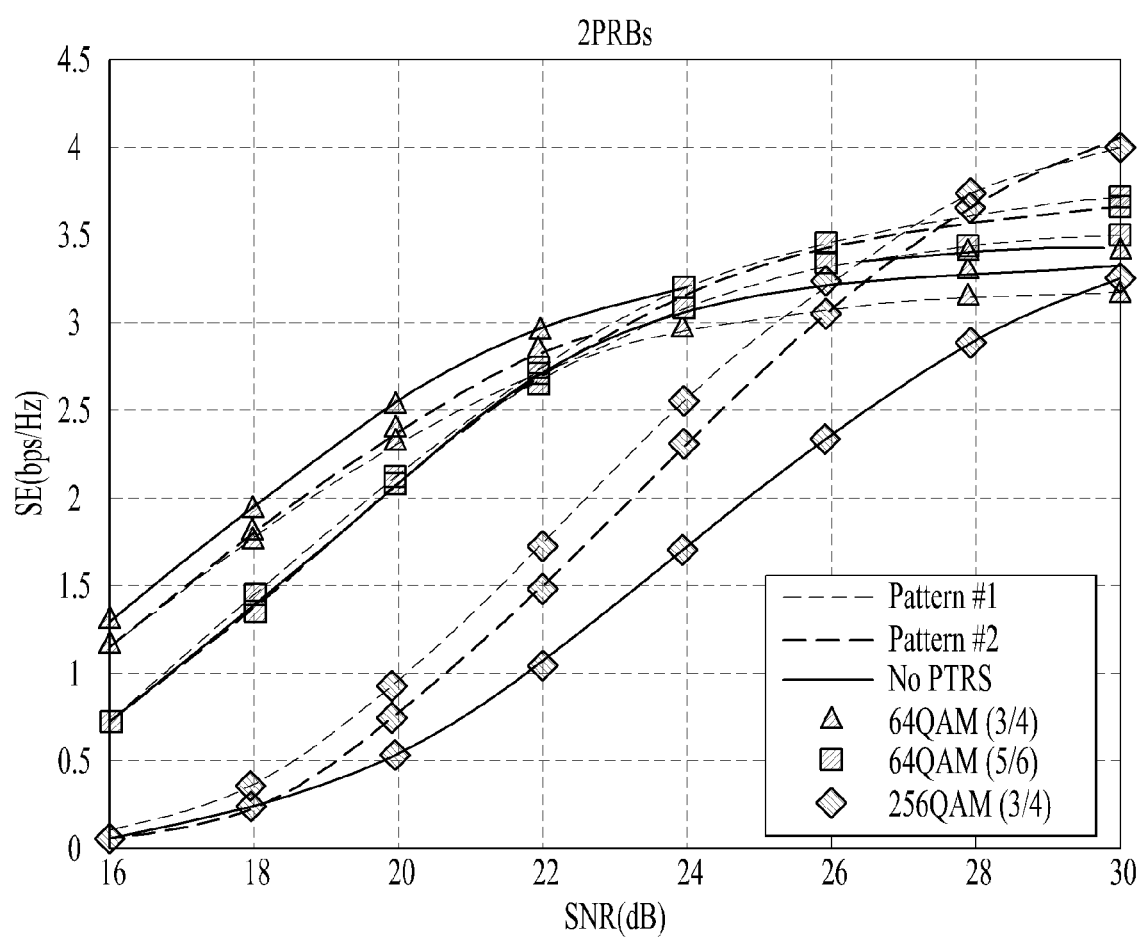
FIG. 24 is a diagram illustrating performance depending on the number of PTRS carriers.

Referring to Table 20, whether the PTRS is OFF may be determined depending on the modulation or MCS as well as the BW. FIG. 24 shows that in the case of 64-QAM, if BW corresponds to two RBs, no PTRS is transmitted to obtain better performance. Meanwhile, in the case of 256-QAM, the PTRS is transmitted to obtain better performance. In other words, when a small number of RBs are used, whether the PTRS is ON/OFF may be determined based on the modulation. To this end, related information may be signaled to a UE or a BS, but the present disclosure is not limited thereto. Table 22 may be configured based on FIG. 24.

TABLE 22

| Scheduled BW | Frequency density | | The maximum possible number of PT-RS subcarriers |
|---|---|---|---|
| $N_{RB} < 3$ | 1 | 64QAM | 0 |
| | | 256QAM | 4 |
| $3 <= N_{RB} < 8$ | 1 | | 4 |
| $8 <= N_{RB} < 16$ | ½ | | 4 |
| $16 <= N_{RB}$ | ¼ | | 16 |

In the case of 64-QAM, the maximum number of transmittable PTRSs is 0, and thus, the PTRS may be turned off. Meanwhile, in the case of 256-QAM, the maximum number of transmittable PTRSs is set to 4, and PTRS transmission may be allowed. To prevent the PRB including the PTRS from overlapping between UEs, all RBs for transmitting the PTRS may be shifted in the frequency domain.

For example, the PTRS may be transmitted in RBs #0, #2, #4, and #6 among 10 PRBs. In this case, to prevent from other UEs using the corresponding RBs, the PTRS may be transmitted in RBs #1, #3, #5, and #6 or RBs #2, #4, #6, and #7. In addition, the shifting value may be determined by the UE ID and the maximum number of shiftable RBs (for example, in the case of 10 RBs, the shifting value is 3).

Figure 25:
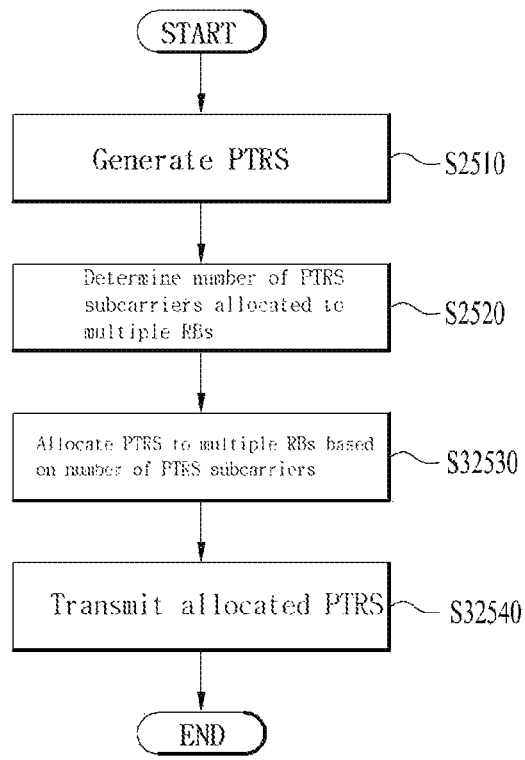
FIG. 25 is a flowchart illustrating a PTRS allocation method.

FIG. 25 is a flowchart illustrating a PTRS allocation method.

A BS may generate a PTRS (S2510). Then, the BS may determine the number of PTRS subcarriers to be allocated to a plurality of RBs (S2520). As described above with reference to FIGS. 1 to 24, the number of PTRS subcarriers may be configured for each RB. For example, one PTRS subcarrier may be allocated for every two or four RBs. When the BW increases, the number of RBs to which PTRS subcarriers are allocated may increase. The number of RBs to which PTRS subcarriers are allocated may correspond to FD as described above.

Next, the BS may allocate the PTRS to the plurality of RBs based on the number of PTRS subcarriers (S2530) and transmit the allocated PTRS (S2540). As described above with reference to FIGS. 1 to 24, the number of PTRS subcarriers may be determined depending on the interval in which the scheduled BW is included. That is, referring to the above tables, the number of PTRS subcarriers or the FD may be determined by the corresponding interval. In this case, to prevent the number of PTRS subcarriers from sharply decreasing at the boundaries of intervals, the number of allocated PTRS subcarriers may be adjusted for each interval. Such adjustment may be determined according to the above equations. As the scheduled BW becomes larger, the number of PTRS subcarriers may increase or be maintained based on the interval. For example, when the BW is small, no PTRS may be required. Referring to the above tables, in the case of a specific interval where the BW is small, no PTRS may be allocated. In another specific interval, the PTRS may be allocated for each RB. In still another specific interval, the number of PTRS carriers may be maintained at a certain level. In summary, the number of PTRS carriers may increase or be maintained instead of sharply decreasing at the interval boundary. In addition, the number of PTRS carriers may be determined based on the maximum number of PTRS carriers and the FD, which depend on the scheduled BW. That is, the FD may decrease as the scheduled BW increases. However, as described above, the number of PTRS carriers may not increase above a certain level even though the scheduled BW increases.

Device Configuration

Figure 26:
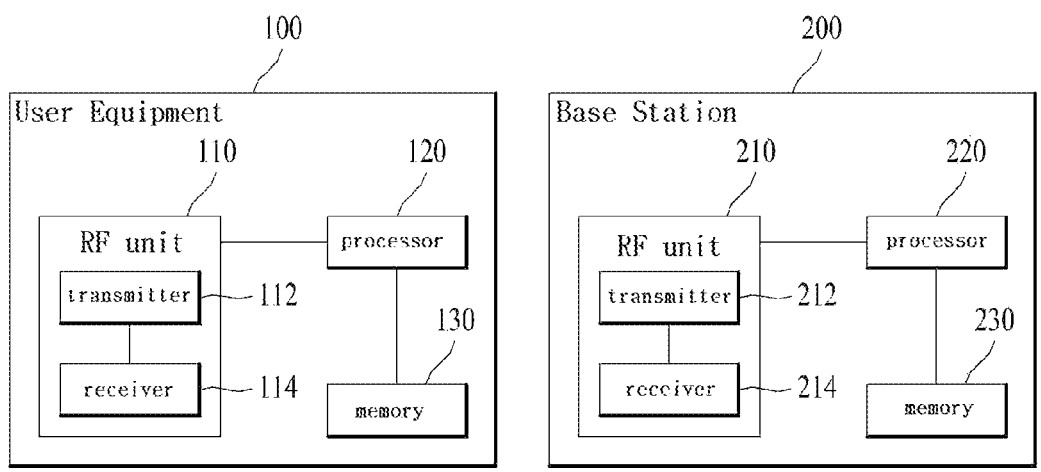
FIG. 26 is a diagram illustrating the configurations of a user equipment and a base station according to an embodiment of the present disclosure.

FIG. 26 is a diagram illustrating the configuration of a user equipment and a base station according to an embodiment of the present disclosure. In FIG. 26, the user equipment 100 and the base station 200 may include radio frequency (RF) units 110 and 210, processors 120 and 220, and memories 130 and 230, respectively. Although FIG. 32 shows a 1:1 communication environment between the user equipment 100 and base station 200, a communication environment may be established between a plurality of user equipments and a plurality of base stations. In addition, the configuration of the base station 200 shown in FIG. 26 may be applied to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments. The processor 120 is functionally connected to the transmitter 112 and the receiver 114 and controls processes performed by the transmitter 112 and the receiver 114 to transmit and receive signals to and from other devices. The processor 120 processes a signal to be transmitted, sends the processed signal to the transmitter 112, and processes a signal received by the receiver 114.

If necessary, the processor 120 may store information in an exchanged message in the memory 130. With the above configuration, the user equipment 100 may perform the methods described in various embodiments of the present disclosure.

The transmitter 212 and the receiver 214 of the base station 200 are configured to transmit and receive signals to and from another base station and user equipments. The processor 220 is functionally connected to the transmitter 212 and the receiver 214 and controls processes performed by the transmitter 212 and the receiver 214 to transmit and receive signals to and from other devices. The processor 220 processes a signal to be transmitted, sends the processed signal to the transmitter 212, and processes a signal received by the receiver 214. If necessary, the processor 220 may store information in an exchanged message in the memory 230. With the above configuration, the base station 200 may perform the methods described in various embodiments of the present disclosure.

The processors 120 of the user equipment 100 and the processor 220 of the base station 200 instruct (for example, control, adjust, or manage) operations of the user equipment 100 and the base station 200, respectively. The processors 120 and 220 may be connected to the memories 130 and 230 to store program code and data, respectively. The memories 130 and 230 are respectively connected to the processors 120 and 220 so as to store operating systems, applications and general files.

Each of the processors 120 and 220 of the present disclosure may be called a controller, a microcontroller, a microprocessor, a microcomputer, etc. Each of the processors 120 and 220 may be implemented by hardware, firmware, software, or any combination thereof.

When the embodiments of the present disclosure are implemented by hardware, application specific integrated circuits (ASICs), digital signal processors (DSPs), digital signal processing devices (DSPDs), programmable logic devices (PLDs), field programmable gate arrays (FPGAs), and the like may be included in the processors 120 and 220.

In case of the implementation by firmware or software, a method according to each embodiment of the present disclosure may be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present disclosure are provided to be implemented by those skilled in the art. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give a broadest scope matching the principles and new features disclosed herein. In addition, although the present disclosure has been described with reference to the preferred embodiments thereof, it will be apparent to those skilled in the art that not only the disclosure is not limited to the aforementioned specific embodiments but various modifications may be made in the present disclosure without departing from the spirit or scope of the disclosure. Such modifications are not to be construed individually from the technical spirit and scope of the present disclosure.

The present specification describes both the apparatus and method, and if necessary, the description of both the apparatus and method may be complementally applied.

INDUSTRIAL APPLICABILITY

The aforementioned contents may be applied not only to 3GPP system and LTE-A but also to various wireless communication systems including an IEEE 802.16x system and IEEE 802.11x system. Further, the proposed method may also be applied to an mmWave communication system using ultrahigh frequency band.

The invention claimed is:

1. A method of transmitting, by a base station, a signal for enabling a user equipment (UE) to eliminate phase noise in a millimeter wave (mmWave) communication system, the method comprising:
    generating a phase tracking reference signal (PTRS);
    allocating the PTRS to one or more resource blocks included in a scheduled bandwidth; and
    transmitting the allocated PTRS,
    wherein an interval between the one or more resource blocks to which the PTRS is allocated is determined based on the scheduled bandwidth, and
    wherein indices of the resource blocks to which the PTRS is allocated are shifted based on at least one of identification (ID) of the UE or a maximum number of shiftable resource blocks.

2. The method of claim 1, wherein the interval between the one or more resource blocks to which the PTRS is allocated is 1 based on the scheduled bandwidth less than a first threshold, one PTRS being allocated for each resource block,
    wherein the interval between the one or more resource blocks to which the PTRS is allocated is 2 based on the scheduled bandwidth more than or equal to the first threshold and less than a second threshold, one PTRS being allocated for every two resource blocks, and
    wherein the interval between the one or more resource blocks to which the PTRS is allocated is 4 based on the scheduled bandwidth more than the second threshold, one PTRS being allocated for every four resource blocks.

3. The method of claim 1, wherein a maximum number of PTRS subcarriers to which the PTRS is allocated is determined based on the scheduled bandwidth.

4. The method of claim 3, wherein based on the PTRS allocated based on the interval between the one or more resource blocks to which the PTRS is allocated and a number of the one or more resource blocks to which the PTRS is allocated more than the maximum number of PTRS subcarriers, the PTRS is not allocated to remaining resource blocks included in the scheduled bandwidth.

5. The method of claim 1, wherein the PTRS is allocated from a resource block with a low resource block index based on the interval between the one or more resource blocks to which the PTRS is allocated.

6. The method of claim 1, wherein the maximum number of shiftable resource blocks corresponds to the interval between the one or more resource blocks to which the PTRS is allocated.

7. The method of claim 1, wherein a number of one or more PTRS subcarriers to which PTRS is allocated is determined based on the scheduled bandwidth.

8. The method of claim 7, wherein resource block indices of the one or more resource blocks to which the PTRS is allocated are determined according to Equation A:

$$i = \left\lfloor l\frac{P}{L} \right\rfloor + k, l = 0, 1, \ldots, L-1,$$ [Equation A]

where i denotes the indices of the resource blocks to which the PTRS is allocated, P denotes the scheduled bandwidth, L denotes the number of one or more PTRS subcarriers to which the PTRS is allocated, and k denotes an offset value.

9. A base station for transmitting a signal for enabling a user equipment (UE) to eliminate phase noise in a millimeter wave (mmWave) communication system, the base station comprising:
a receiver configured to receive a signal from an external device;
a transmitter configured to transmit a signal to an external device; and
a processor configured to control the receiver and the transmitter,
wherein the processor is configured to:
generate a phase tracking reference signal (PTRS);
allocate the PTRS to one or more resource blocks included in a scheduled bandwidth; and
control the transmitter to transmit the allocated PTRS, and
wherein an interval between the one or more resource blocks to which the PTRS is allocated is determined based on the scheduled bandwidth, and
wherein indices of the resource blocks to which the PTRS is allocated are shifted based on at least one of identification (ID) of the UE or a maximum number of shiftable resource blocks.

10. The base station of claim 9, wherein the interval between the one or more resource blocks to which the PTRS is allocated is 1 based on the scheduled bandwidth less than a first threshold, one PTRS being allocated for each resource block,
wherein the interval between the one or more resource blocks to which the PTRS is allocated is 2 based on the scheduled bandwidth more than or equal to the first threshold and less than a second threshold, one PTRS being allocated for every two resource blocks, and
wherein the interval between the one or more resource blocks to which the PTRS is allocated is 4 based on the scheduled bandwidth more than the second threshold, one PTRS being allocated for every four resource blocks.

11. The base station of claim 9, wherein a maximum number of PTRS subcarriers to which the PTRS is allocated is determined based on the scheduled bandwidth.

12. The base station of claim 11, wherein based on the PTRS allocated based on the interval between the one or more resource blocks to which the PTRS is allocated and a number of the one or more resource blocks to which the PTRS is allocated more than the maximum number of PTRS subcarriers, the PTRS is not allocated to remaining resource blocks included in the scheduled bandwidth.

13. The base station of claim 9, wherein the PTRS is allocated starting from a resource block with a low resource block index based on the interval between the one or more resource blocks to which the PTRS is allocated.

14. The base station of claim 9, wherein the maximum number of shiftable resource blocks corresponds to the interval between the one or more resource blocks to which the PTRS is allocated.

15. The base station of claim 9, wherein a number of one or more PTRS subcarriers to which PTRS is allocated is determined based on the scheduled bandwidth.

16. The base station of claim 15, wherein resource block indices of the one or more resource blocks to which the PTRS is allocated are determined according to Equation A:

$$i = \left\lfloor l\frac{P}{L} \right\rfloor + k, l = 0, 1, \ldots, L-1$$ [Equation A]

where i denotes the indices of the resource blocks to which the PTRS is allocated, P denotes the scheduled bandwidth, L denotes the number of one or more PTRS subcarriers to which the PTRS is allocated, and k denotes an offset value.

* * * * *